US011682154B2

United States Patent
Yasukawa

(10) Patent No.: US 11,682,154 B2
(45) Date of Patent: Jun. 20, 2023

(54) MOVING IMAGE PROCESSING METHOD OF A MOVING IMAGE VIEWED BY A VIEWING USER, A SERVER DEVICE CONTROLLING THE MOVING IMAGE, AND A COMPUTER PROGRAM THEREOF

(71) Applicant: GREE, Inc., Tokyo (JP)

(72) Inventor: Takashi Yasukawa, Minato-ku (JP)

(73) Assignee: GREE, INC., Tokyo (JP)

( * ) Notice: Subject to any disclaimer, the term of this patent is extended or adjusted under 35 U.S.C. 154(b) by 310 days.

(21) Appl. No.: 17/016,131

(22) Filed: Sep. 9, 2020

(65) Prior Publication Data

US 2021/0134041 A1 May 6, 2021

(30) Foreign Application Priority Data

Oct. 31, 2019 (JP) .............................. JP2019-198441
Aug. 13, 2020 (JP) .............................. JP2020-136660

(51) Int. Cl.
G06T 13/40 (2011.01)
G06T 7/246 (2017.01)
G06T 7/73 (2017.01)
G06T 7/579 (2017.01)

(52) U.S. Cl.
CPC .............. *G06T 13/40* (2013.01); *G06T 7/251* (2017.01); *G06T 7/579* (2017.01); *G06T 7/75* (2017.01); *G06T 2210/21* (2013.01)

(58) Field of Classification Search
None
See application file for complete search history.

(56) References Cited

U.S. PATENT DOCUMENTS 7,958,457 B1 * 6/2011 Brandenberg .......... G06N 7/005
                                                        715/811
10,311,679 B2 * 6/2019 Washington .......... A63F 13/352
(Continued)

FOREIGN PATENT DOCUMENTS

JP       2012-120098 A     6/2012
JP       6431233           11/2018
(Continued)

OTHER PUBLICATIONS

Notice of Refusal issued by Japan Intellectual Property Office, corresponding with the Japanese Application No. 2020-136660, dated Sep. 14, 2021.(10 pages).
(Continued)

*Primary Examiner* — Hilina K Demeter
(74) *Attorney, Agent, or Firm* — Finnegan, Henderson, Farabow, Garrett & Dunner LLP

(57) ABSTRACT

A moving image processing method includes: generating a moving image including an animation of an avatar object of a distribution user, based on a motion of the distribution user; receiving a request signal that is generated based on a manipulation of a viewing user viewing the moving image and requests that a first gift object is applied to the avatar object from a terminal device of the viewing user through a communication line; displaying the first gift object that is applied to the avatar object based on the request signal on the moving image; and a second gift object on the moving image in a case where it is determined that the avatar object executes a predetermined action with respect to one or a plurality of first gift objects displayed on the moving image, based on the motion of the distribution user.

30 Claims, 10 Drawing Sheets

(56) References Cited

U.S. PATENT DOCUMENTS

| | | | | |
|---|---|---|---|---|
| 10,796,489 | B1* | 10/2020 | Cordes | A63F 13/213 |
| 2010/0138756 | A1* | 6/2010 | Saund | H04L 51/04 |
| | | | | 715/758 |
| 2019/0349636 | A1 | 11/2019 | Watanabe et al. | |

FOREIGN PATENT DOCUMENTS

| | | |
|---|---|---|
| JP | 2019-8751 A | 1/2019 |
| WO | WO 2018142494 A1 | 8/2018 |

OTHER PUBLICATIONS

Nozawa, "Case 01, Communication with Virtual Character," CG World, Japan, Born Digital K. K. Sep. 1, 2018, vol. 241, pp. 046-051 (10 pages).

Suzukake no Tami, Research for the avatar moves freely only when an object hits, Online, Twitter, Mar. 7, 2019, retrieved https://twitter.com/suzukake0/status/1103634455103565824 (1 page).

PCT International Search Report, corresponding to PCT Application No. PCT/JP2020/017694, dated Jun. 30, 2021 (5 pages).

PCT Written Opinion, corresponding to PCT Application No. PCT/JP2020/017694, dated Jun. 30, 2021 (6 pages).

"Virtual Cast", [online], [Searched on Sep. 10, 2019], Internet <URL: https://virtualcast.jp/>.

Office Action issued in Japan Patent Office for Japanese Application No. 2019-198441, dated Feb. 12, 2020 (7 pages, plus 12 pages of translation).

Yamaguchi, Dwango, "VirtualCast" [online], IT Media Co., Ltd., [Searched on Apr. 13, 2018], Internet <URL: https://www.itmedia.co.jp/news/articles/1804/13/news137.html>.

Suzukakenotami, @Suzukake0, Twitter, [Searched on Mar. 7, 2019], Internet <URL: https://twitter.com/suzukake0/status/1103634455103565824.

* cited by examiner

MOVING IMAGE PROCESSING METHOD OF A MOVING IMAGE VIEWED BY A VIEWING USER, A SERVER DEVICE CONTROLLING THE MOVING IMAGE, AND A COMPUTER PROGRAM THEREOF

CROSS REFERENCE TO RELATED APPLICATIONS

This application claims priority to Japanese Patent Application Nos. 2019-198441 and 2020-136660, filed Oct. 31, 2019 and Aug. 13, 2020, respectively, the contents of which are incorporated herein by reference in their entirety.

BACKGROUND

Technical Field

A technology disclosed in the present application relates to a moving image (e.g., video) processing method of a moving image that is viewed by a viewing user, a server device controlling the moving image, and a computer program.

Related Art

From the related art, a moving image distribution service that distributes a moving image to a terminal device through a network has been known. In such a moving image distribution service, an environment is provided in which an avatar (an avatar object) of a distribution user distributing the moving image can be displayed, or a viewing user viewing the moving image and the distribution user are capable of communicating with each other through a message, chat, or the like.

Further, as a communication tool between the viewing user and the distribution user, JP 2012-120098 A discloses that an action of providing an item that is acquired by the viewing user to the avatar object (the distribution user) in the moving image as a present (gifting) is electronically realized.

In addition, in the moving image distribution service such as VirtualCast (Registered Trademark), an environment is provided in which a gift that is gifted to the avatar object (the distribution user) from the viewing user can be gripped by the avatar object on the moving image, based on the motion of the distribution user ("VirtualCast", [online], [searched on Sep. 10, 2019], Internet (URL:https://virtualcast.jp/)).

Note that, JP 2012-120098 A and "VirtualCast", [online], [searched on Sep. 10, 2019], Internet (URL:https://virtualcast.jp/) described above are incorporated herein by reference in their entirety.

The gifting disclosed in JP 2012-120098 A and "VirtualCast", [online], [searched on Sep. 10, 2019], Internet (URL: https://virtualcast.jp/) fosters the affinity or the sense of involvement of the viewing user with respect to the avatar object through direct communication between the viewing user and the distribution user (an avatar). However, in the technology disclosed in JP 2012-120098 A and "VirtualCast", [online], [searched on Sep. 10, 2019], Internet (URL: https://virtualcast.jp/), only the environment in which the gift corresponding to the gifting is displayed on the moving image or the environment in which the gift can be gripped by the avatar object on the moving image is provided, but a gifting opportunity of the viewing user is still limited.

In addition, the gifting indicates an aspect in which the viewing user purchases a gift by paying the price to a service provider providing the moving image distribution service, and then, gifts the gift to the distribution user (the avatar object), and thus, increasing the gifting opportunity of the viewing user can be a challenge for the service provider, from the viewpoint of the operation of the moving image distribution service.

SUMMARY

In view of the issues encountered in the related art, some embodiments disclosed in the present application provide a moving image processing method, a server device, and a computer program, for increasing the gifting opportunity of the viewing user.

A moving image processing method according to one aspect is a moving image processing method to be executed by one or a plurality of processors that execute a computer-readable command, which includes: a generation step of generating a moving image including an animation of an avatar object of a distribution user, based on a motion of the distribution user; a reception step of receiving a request signal that is generated based on a manipulation of a viewing user viewing the moving image and requests that a first gift object is applied to the avatar object from a terminal device of the viewing user through a communication line; a first display step of displaying the first gift object that is applied to the avatar object based on the request signal on the moving image; and a second display step of displaying a second gift object different from the first gift object subjected to a predetermined action on the moving image in a case where it is determined that the avatar object executes the predetermined action with respect to one or a plurality of first gift objects displayed on the moving image, based on the motion of the distribution user.

A server device according to one aspect is a server device, including: one or a plurality of processors, in which the processor generates a moving image including an animation of an avatar object of a distribution user, based on a motion of the distribution user, receives a request signal that is generated based on a manipulation of a viewing user viewing the moving image and requests that a first gift object is applied to the avatar object from a terminal device of the viewing user through a communication line, displays the first gift object that is applied to the avatar object based on the request signal on the moving image, and displays a second gift object different from the first gift object subjected to a predetermined action on the moving image in a case where it is determined that the avatar object executes the predetermined action with respect to one or a plurality of first gift objects displayed on the moving image, based on the motion of the distribution user, by the terminal device of the distribution user.

A server device according to one aspect is a server device, including: one or a plurality of processors, in which the processor transmits information for generating a moving image including an animation of an avatar object of a distribution user, based on a motion of the distribution user, to a terminal device of the distribution user, generating the moving image, or a terminal device of a viewing user, receives a request signal that is generated based on a manipulation of the viewing user viewing the moving image and requests that a first gift object is applied to the avatar object from the terminal device of the viewing user through a communication line, transmits information relevant to the first gift object that is applied to the avatar object based on the request signal to the terminal device of the distribution user, displaying the first gift object on the moving image, or the terminal device of the viewing user, and transmits information relevant to a second gift object different from the first gift object subjected to a predetermined action to the terminal device of the distribution user, displaying the second gift object on the moving image, or the terminal device of the viewing user in a case where it is determined that the avatar object executes the predetermined action with respect to one or a plurality of first gift objects displayed on the moving image, based on the motion of the distribution user, by the terminal device of the distribution user.

A computer program according to one aspect is a computer program to be executed by one or a plurality of processors such that the processor functions to: generate a moving image including an animation of an avatar object of a distribution user, based on a motion of the distribution user; receive a request signal that is generated based on a manipulation of a viewing user viewing the moving image and requests that a first gift object is applied to the avatar object from a server device or a terminal device of the viewing user through a communication line; display the first gift object that is applied to the avatar object based on the request signal on the moving image; and display a second gift object different from the first gift object subjected to a predetermined action on the moving image in a case where it is determined that the avatar object executes the predetermined action with respect to one or a plurality of first gift objects displayed on the moving image, based on the motion of the distribution user.

A computer program according to one aspect is a computer program to be executed by one or a plurality of processors such that the processor functions to: transmit information for generating a moving image including an animation of an avatar object of a distribution user, based on a motion of the distribution user, to a server device generating the moving image or a terminal device of a viewing user; receive a request signal that is generated based on a manipulation of the viewing user viewing the moving image and requests that a first gift object is applied to the avatar object from the server device or the terminal device of the viewing user through a communication line; transmit information relevant to the first gift object that is applied to the avatar object based on the request signal to the server device displaying the first gift object on the moving image or the terminal device of the viewing user; and transmit information relevant to a second gift object different from the first gift object subjected to a predetermined action to the server device displaying the second gift object on the moving image or the terminal device of the viewing user, in a case where it is determined that the avatar object executes the predetermined action with respect to one or a plurality of first gift objects displayed on the moving image, based on the motion of the distribution user.

A computer program according to one aspect is a computer program to be executed by one or a plurality of processors such that the processor functions to: receive information relevant to a moving image from a server device or a terminal device of a distribution user, in order to generate the moving image including an animation of an avatar object of the distribution user, based on a motion of the distribution user; transmit a request signal that is generated based on a manipulation of a viewing user viewing the moving image and requests that a first gift object is applied to the avatar object through a communication line; receive information relevant to the first gift object from the server device or the terminal device of the distribution user, in order to display the first gift object that is applied to the avatar object based on the request signal on the moving image; and receive information relevant to a second gift object from the server device or the terminal device of the distribution user, in order to display the second gift object different from the first gift object subjected to a predetermined action on the moving image in a case where it is determined that the avatar object executes the predetermined action with respect to one or a plurality of first gift objects displayed on the moving image, based on the motion of the distribution user, by the terminal device of the distribution user.

A computer program according to one aspect is a computer program to be executed by one or a plurality of processors such that the processor functions to: receive a moving image including an animation of an avatar object of a distribution user, based on a motion of the distribution user, from a server device or a terminal device of the distribution user; transmit a request signal that is generated based on a manipulation of a viewing user viewing the moving image and requests that a first gift object is applied to the avatar object through a communication line; receive the moving image on which the first gift object that is applied to the avatar object based on the request signal is displayed from the server device or the terminal device of the distribution user; and receive the moving image on which a second gift object different from the first gift object subjected to a predetermined action is displayed from the server device or the terminal device of the distribution user in a case where it is determined that the avatar object executes the predetermined action with respect to one or a plurality of first gift objects displayed on the moving image, based on the motion of the distribution user, by the terminal device of the distribution user.

DETAILED DESCRIPTION

Figure 1:
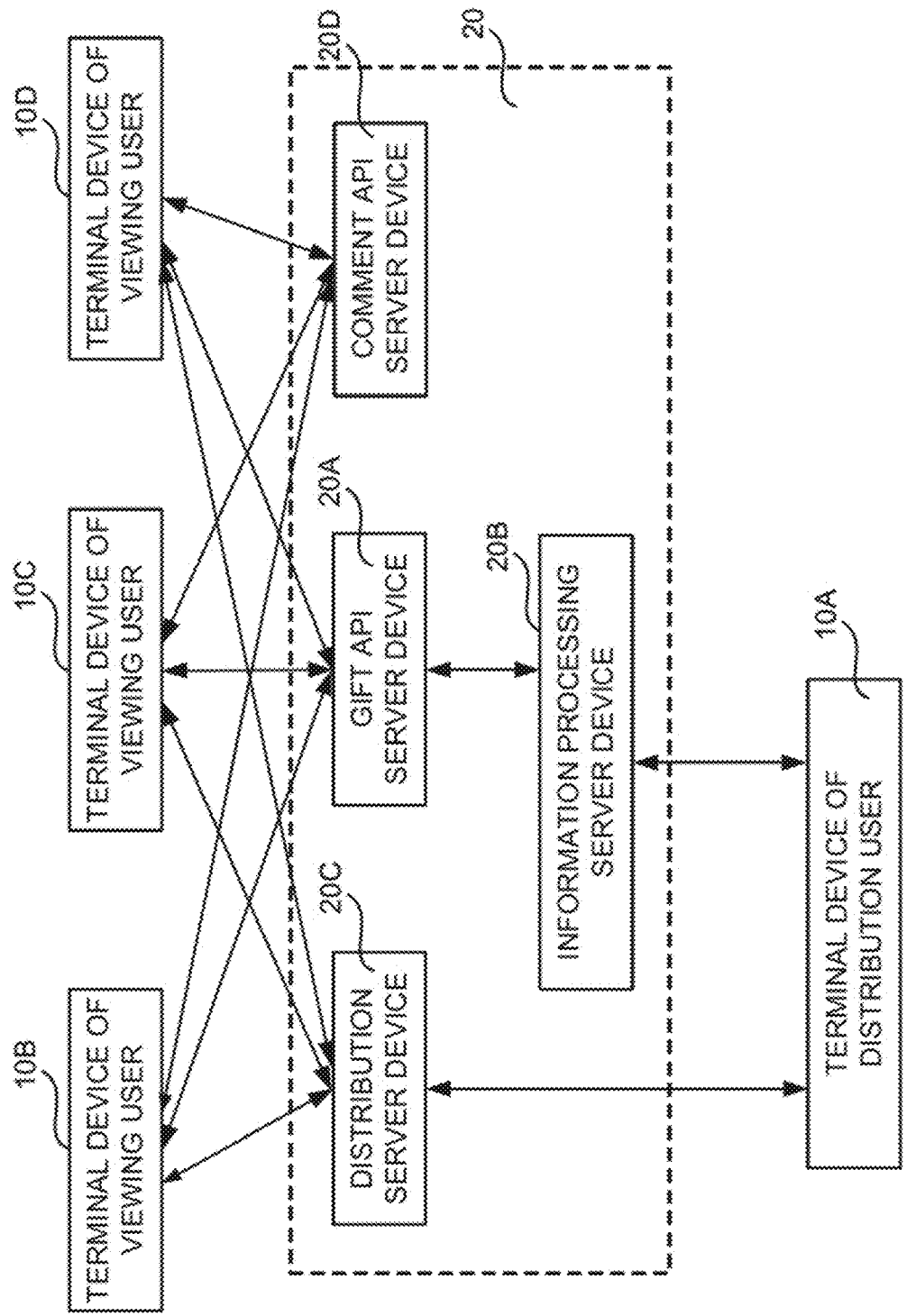
FIG. 1 is a block diagram illustrating an example of a configuration of a moving image distribution system according to one embodiment.

Hereinafter, various embodiments of the present disclosure will be described with reference to the drawings. Note that, in the drawings, the same reference numerals are applied to the common constituents. In addition, it should be noted that constituents illustrated in one drawing may be omitted in another drawing, for convenience of description.

In addition, it should be noted that the accompanying drawings are not necessarily drawn to scale. In addition, a term such as an application may be referred to as software or a program, or may be commands with respect to a computer that are combined such that a certain result can be obtained. As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As another example, if it is stated that a component includes A, B, or C, then unless specifically stated otherwise or infeasible, the component may include A, or B, or C, or A and B, or A and C, or B and C, or A and B and C.

1. Configuration of Moving Image Distribution System

In short, a moving image distribution system 1 disclosed in the present application enables a distribution user performing distribution to distribute a moving image including an animation of an avatar object, which is generated based on data relevant to the motion of the distribution user or sound data relevant to speech or singing emanated by the distribution user, to a terminal device of a viewing user viewing the moving image through a communication line, by using a terminal device of the distribution user. The avatar object includes an avatar, a game video object, and any object or game display that the distribution user is playing in.

FIG. 1 is a block diagram illustrating an example of the configuration of the moving image distribution system 1 according to one embodiment. As illustrated in FIG. 1, the moving image distribution system 1 is capable of including a plurality of terminal devices 10 to be connected to the communication line (not illustrated), and one or more server devices 20 to be connected to the communication line. Each of the terminal devices 10 is connected to one or more server devices 20 through the communication line.

Note that, the communication line is capable of including a mobile phone network, a radio LAN, a fixed telephone network, the internet, an intranet or Ethernet (Registered Trademark) without being limited thereto.

1-1. Terminal Device 10

As illustrated in FIG. 1, the plurality of terminal devices 10 are capable of including terminal devices 10 of one or more distribution users (here, terminal devices 10A) and terminal devices 10 of one or more viewing users (here, terminal devices 10B and 10D). Each of the terminal devices 10 has the common configuration, and thus, can be either a terminal device for distributing the moving image (the terminal device 10 of the distribution user) and a terminal device for viewing the moving image (the terminal device 10 of the viewing user).

In a case where each of the terminal devices 10 motions as the terminal device 10 of the distribution user, each of the terminal devices 10 is capable of acquiring the data relevant to the motion of the distribution user or the sound data relevant to the speech or the singing emanated by the distribution user, by executing a moving image distribution application that is installed, of generating the moving image including the animation of a virtual character (the avatar object) that is changed in accordance with the acquired data, and of transmitting the moving image to a server device 20 (a distribution server device 20C) through the communication line. The moving image is distributed to a terminal device 10 for receiving the moving image (the terminal device 10 of the viewing user), which executes a moving image viewing application that is installed, through the communication line, by the server device 20 (the distribution server device 20C).

Further, in a case where each of the terminal devices 10 motions as the terminal device 10 of the distribution user, when the server device 20 receives one or a plurality of request signals (including both of a case where a plurality of request signals are transmitted from the terminal device 10 of one viewing user and a case where a request signal is transmitted from the terminal devices 10 of a plurality of viewing users) for requesting that a gift object (a first gift object) is applied to the distribution user (the avatar object) based on the manipulation of the viewing user (gifting) from the terminal device 10 of the viewing user viewing the moving image through the communication line, each of the terminal devices 10 is capable of receiving the request signal from the server device 20 (an information processing server device 20B), and of displaying the first gift object on the moving image including the animation of the avatar object. A specific method for displaying the first gift object on the moving image will be described below.

In addition, in a case where each of the terminal devices 10 motions as the terminal device 10 of the distribution user, when the terminal device 10 determines that the avatar object executes a predetermined action with respect to one or a plurality of first gift objects displayed on the moving image, based on the motion of the distribution user, the terminal device 10 is capable of displaying a second gift object different from the first gift object subjected to the predetermined action on the moving image. Note that, the details of the predetermined action, the details of a determination method of the predetermined action, and a specific method for displaying the second gift object on the moving image will be described below.

On the other hand, in a case where each of the terminal devices 10 motions as the terminal device for viewing the moving image (the terminal device of the viewing user), each of the terminal devices 10 is capable of receiving the moving image that is distributed by the terminal device 10 of the distribution user through the server device 20 (the distribution server device 20C), by executing the installed moving image viewing application.

Further, in a case where each of the terminal devices 10 motions as the terminal device of the viewing user, each of the terminal devices 10 is capable of transmitting the request signal for requesting that the first gift object is applied to the distribution user (the avatar object) based on the manipulation of the viewing user (gifting) to the server device 20 (a gift API server device 20A), by executing the moving image viewing application.

Further, in a case where each of the terminal devices 10 motions as the terminal device of the viewing user, each of the terminal devices 10 is capable of transmitting information relevant to a comment with respect to the distribution user (the avatar object) from the viewing user, to the server device 20 (a comment API server device 20D), by executing the moving image viewing application.

Note that, the moving image distribution application and the moving image viewing application described above can be installed and executed in each of the terminal devices 10, as one integrated application or as each individual application.

Each of the terminal devices 10 is an arbitrary terminal device that is capable of executing such a motion, and is capable of including a smart phone, a tablet, a mobile phone (a feature phone) or a personal computer without being limited thereto.

1-2. Server Device 20

As illustrated in FIG. 1, the server device 20 can also be referred to as the moving image distribution system in which a plurality of server devices described below are combined.

The server device 20 is capable of distributing the moving image including the animation of the avatar object, which is transmitted from the terminal device 10 of the distribution user, to the terminal devices 10 of each of the viewing users.

Further, the server device 20 is capable of receiving one or a plurality of request signals (including both of a case where the plurality of request signals are transmitted from one viewing user terminal device 10 and a case where the request signal is transmitted from the terminal devices 10 of the plurality of viewing users) for requesting that the first gift object is applied to the avatar object (gifting) from the terminal devices 10 of each of the viewing users. In addition, the server device 20 transmits information relevant to the request signal to the terminal device 10 of the distribution user, and then, the terminal device 10 of the distribution user generates a moving image in which the first gift object corresponding to the request signal is displayed on the moving image including the animation of the avatar object. The server device 20 is capable of receiving the moving image (the moving image on which the first gift object is displayed) from the terminal device 10 of the distribution user.

In addition, in a case where the terminal device 10 (the terminal device 10 of the distribution user) determines that the avatar object executes the predetermined action with respect to one or a plurality of first gift objects displayed on the moving image, based on the motion of the distribution user, when the terminal device 10 displays the second gift object different from the first gift object subjected to the predetermined action on the moving image, the server device 20 is also capable of receiving a moving image on which the second gift object is displayed from the terminal device 10.

Further, the server device 20 is capable of receiving the information relevant to the comment with respect to the distribution user (the avatar object) from the viewing user, from the terminal device 10 of the viewing user, and of distributing the comment to the viewing users viewing the same moving image.

In order to execute such a motion, in one embodiment, the server device 20 is capable of including the gift API server device 20A, the information processing server device 20B, the distribution server device 20C, and the comment API server device 20D, which are connected to each other through the communication line (including a radio line or a wired line not illustrated).

The gift API server device 20A is capable of receiving one or a plurality of request signals for requesting that the first gift object is applied to the avatar object based on the manipulation of the viewing user (gifting) from the terminal devices 10 of each of the viewing users. At this time, the gift API server device 20A is capable of reading at least identification information of the viewing user executing a gifting action (serial numbers of the terminal devices 10 of each of the viewing users, ID information to be applied to each of the viewing users, or the like), information relevant to the gifted first gift object (information relevant to a type, a name, a color, and a size, or the like), and identification information of the distribution user who is the avatar object as a gifting target (the serial number of the terminal device 10 of the distribution user, the ID information to be applied to the distribution user, or the like), from the request signal, and of transmitting the read information to the information processing server device 20B automatically or at the time of receiving an inquiry from the information processing server device 20B.

The information processing server device 20B is capable of receiving the information that is read by the gift API server device 20A from the gift API server device 20A automatically or by performing a self-inquiry, and of transmitting the information to the terminal device 10 of the distribution user. In addition, the information processing server device 20B is capable of including a table (a database) for each distribution user, and thus, the gift API server device 20A may store the information relevant to the read first gift object in the table for each of the distribution users.

Further, the information processing server device 20B is capable of transmitting all or a part of comment information indicating which viewing user applies which first gift object with respect to the avatar object (the distribution user) to the comment API server device 20D, with reference to the identification information of the viewing user and the information relevant to the first gift object, which are stored.

In addition, the information processing server device 20B may have a function of receiving information indicating that it is determined that the avatar object executes the predetermined action with respect to the first gift object and the second gift object is displayed on the moving image from the terminal device 10 of the distribution user, and of transmitting comment information indicating that the second gift object is displayed on the moving image to the comment API server device 20D.

The distribution server device 20C is capable of distributing the moving image transmitted from the terminal device 10 of the distribution user (including the moving image on which the first gift object is displayed and the moving image on which the second gift object is displayed) to the terminal devices 10 of each of the viewing users.

The comment API server device 20D is capable of receiving a comment of the viewing user from the terminal device 10 of the viewing user, and of distributing the received comment to each of the viewing users viewing the same moving image.

In addition, the comment API server device 20D is capable of distributing a comment corresponding to all or a part of the information indicating which viewing user applies which first gift object to the avatar object (the distribution user), which is received from the information processing server device 20B, to each of the viewing users viewing the same moving image.

In addition, the comment API server device 20D is also capable of distributing a comment corresponding to the comment information to each of the viewing users viewing the same moving image, based on the comment information indicating that the second gift object is displayed on the moving image, which is received from the information processing server device 20B.

Note that, in the example illustrated in FIG. 1, a configuration is illustrated in which the server device 20 includes four server devices including the gift API server device 20A, the information processing server device 20B, the distribution server device 20C, and the comment API server device 20D, in order to disperse a load, or the like. However, at least one server device of such four server devices may be integrated with any of the remaining server devices. For example, the information processing server device 20B and the distribution server device 20C may be integrated.

2. Hardware Configuration of Each Device

Next, an example of a hardware configuration of each of the terminal device 10 and the server device 20 will be described.

2-1. Hardware Configuration of Terminal Device 10

Figure 2:
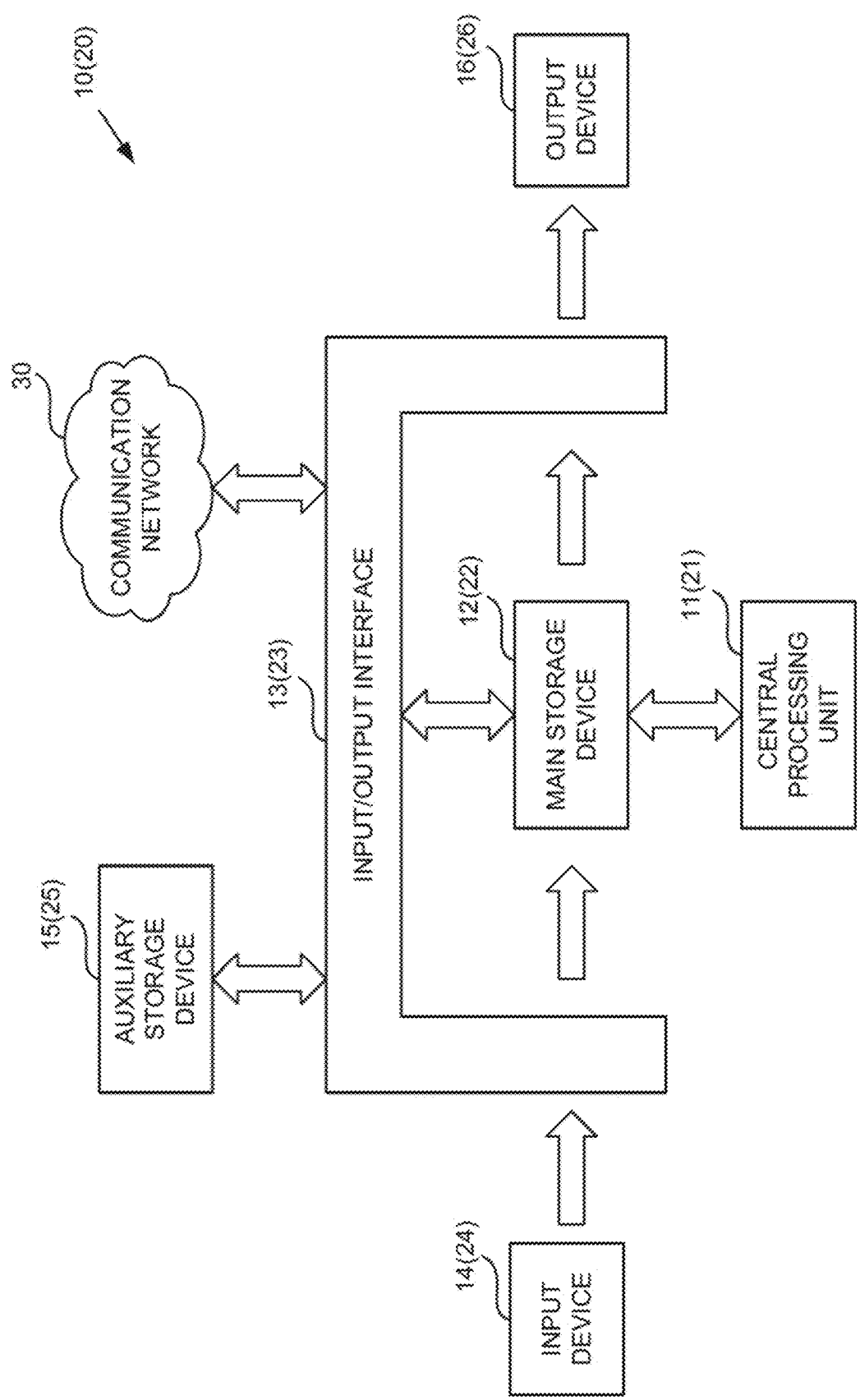
FIG. 2 is a block diagram schematically illustrating an example of a hardware configuration of a terminal device (a server device) illustrated in FIG. 1.

A hardware configuration example of each of the terminal devices 10 will be described with reference to FIG. 2. FIG. 2 is a block diagram schematically illustrating an example of the hardware configuration of the terminal device 10 (the server device 20) illustrated in FIG. 1 (note that, in FIG. 2, reference numerals in parentheses are described in association with the server device 20 as described below).

As illustrated in FIG. 2, each of the terminal devices 10 is capable of mainly including a central processing unit 11, a main storage device 12, an input/output interface 13, an input device 14, an auxiliary storage device 15, and an output device 16. Such devices are connected to each other by a data bus or a control bus.

The central processing unit 11 is referred to as a "CPU", and performs an arithmetic operation with respect to a command and data stored in the main storage device 12 and stores the result of the arithmetic operation in the main storage device 12. Further, the central processing unit 11 is capable of controlling the input device 14, the auxiliary storage device 15, the output device 16, and the like through the input/output interface 13. The terminal device 10 is capable of including one or more central processing units 11.

The main storage device 12 is referred to as a "memory", and stores the received command and data, and the result of the arithmetic operation of the central processing unit 11, from the input device 14, the auxiliary storage device 15, and a communication network 30 (the server device 20 or the like) through the input/output interface 13. The main storage device 12 is capable of including a random access memory (RAM), a read only memory (ROM) or a flash memory without being limited thereto.

The auxiliary storage device 15 is a storage device having capacity larger than that of the main storage device 12. The auxiliary storage device 15 is capable of storing a command and data (a computer program) configuring the specific application described above (the moving image distribution application, the moving image viewing application, or the like), a web browser, or the like, and is capable of transmitting the command and the data (the computer program) to the main storage device 12 through the input/output interface 13 under the control of the central processing unit 11. The auxiliary storage device 15 is capable of including a magnetic disk device or an optical disk device without being limited thereto.

The input device 14 is a device that imports data from the outside, and includes a touch panel, a button, a keyboard, a mouse or a sensor without being limited thereto. As described below, the sensor is capable of including a sensor provided with one or more cameras or one or more microphones without being limited thereto.

The output device 16 is capable of including a display device, a touch panel or a printer device without being limited thereto.

In such a hardware configuration, the central processing unit 11 is capable of sequentially loading the command and the data (the computer program) configuring the specific application, which are stored in the auxiliary storage device 15, in the main storage device 12, and of performing an arithmetic operation with respect to the loaded command and data, and thus, of controlling the output device 16 through the input/output interface 13 or of transmitting and receiving various information items with respect to the other device (for example, the server device 20, the other terminal device 10, and the like) through the input/output interface 13 and the communication network 30.

Accordingly, the terminal device 10 is capable of executing a motion necessary for generating the moving image, a motion necessary for transmitting (distributing) or receiving the moving image, a motion necessary for the gifting action, the determination relevant to whether or not the predetermined action is executed, described below, and a motion necessary for transmitting the comment (further including various motions described below in detail) by executing the specific application that is installed.

Note that, the terminal device 10 may include one or more microprocessors or graphics processing units (GPU), instead of the central processing unit 11 or along with the central processing unit 11.

2-2. Hardware Configuration of Server Device 20

A hardware configuration example of each of the server devices 20 will be also described with reference to FIG. 2. For example, the same hardware configuration as that of each of the terminal devices 10 described above can be used as the hardware configuration of each of the server devices 20 (the gift API server device 20A, the information processing server device 20B, the distribution server device 20C, and the comment API server device 20D). Therefore, reference numerals with respect to constituents of each of the server devices 20 are described in parentheses in FIG. 2.

As illustrated in FIG. 2, each of the server devices 20 is capable of mainly including a central processing unit 21, a main storage device 22, an input/output interface 23, an input device 24, an auxiliary storage device 25, and an output device 26. Such devices are connected to each other by a data bus or a control bus.

The central processing unit 21, the main storage device 22, the input/output interface 23, the input device 24, the auxiliary storage device 25, and the output device 26 can be respectively approximately identical to the central processing unit 11, the main storage device 12, the input/output interface 13, the input device 14, the auxiliary storage device 15, and the output device 16, included in each of the terminal devices 10 described above.

In such a hardware configuration, the central processing unit 21 is capable of sequentially loading a command and data (a computer program) configuring the specific application, which are stored in the auxiliary storage device 25, in the main storage device 22, and of performing an arithmetic operation with respect to the loaded command and data, and thus, of controlling the output device 26 through the input/output interface 23 or of transmitting and receiving various information items with respect to the other device (for example, each of the terminal devices 10, and the like) through the input/output interface 23 and the communication network 30.

Accordingly, the server device 20 is capable of executing a motion necessary for distributing the moving image that is generated and transmitted by the terminal devices 10 of each of the distribution users to the terminal devices 10 of each of the viewing users, a motion necessary for receiving the gifting action that is transmitted from the terminal devices 10 of each of the viewing users, a motion necessary for generating request information necessary for the terminal device 10 to generate the moving image, a motion necessary for transmitting (distributing) or receiving the moving image, and the like (including various motions described below in detail).

Note that, the server device 20 may include one or more microprocessors or graphics processing units (GPU), instead of the central processing unit 21 or along with the central processing unit 21.

3. Function of Each Device

Next, an example of the details of the function of each of the terminal device 10 and the server device 20 will be described.

3-1. Function of Terminal Device 10

Figure 3:
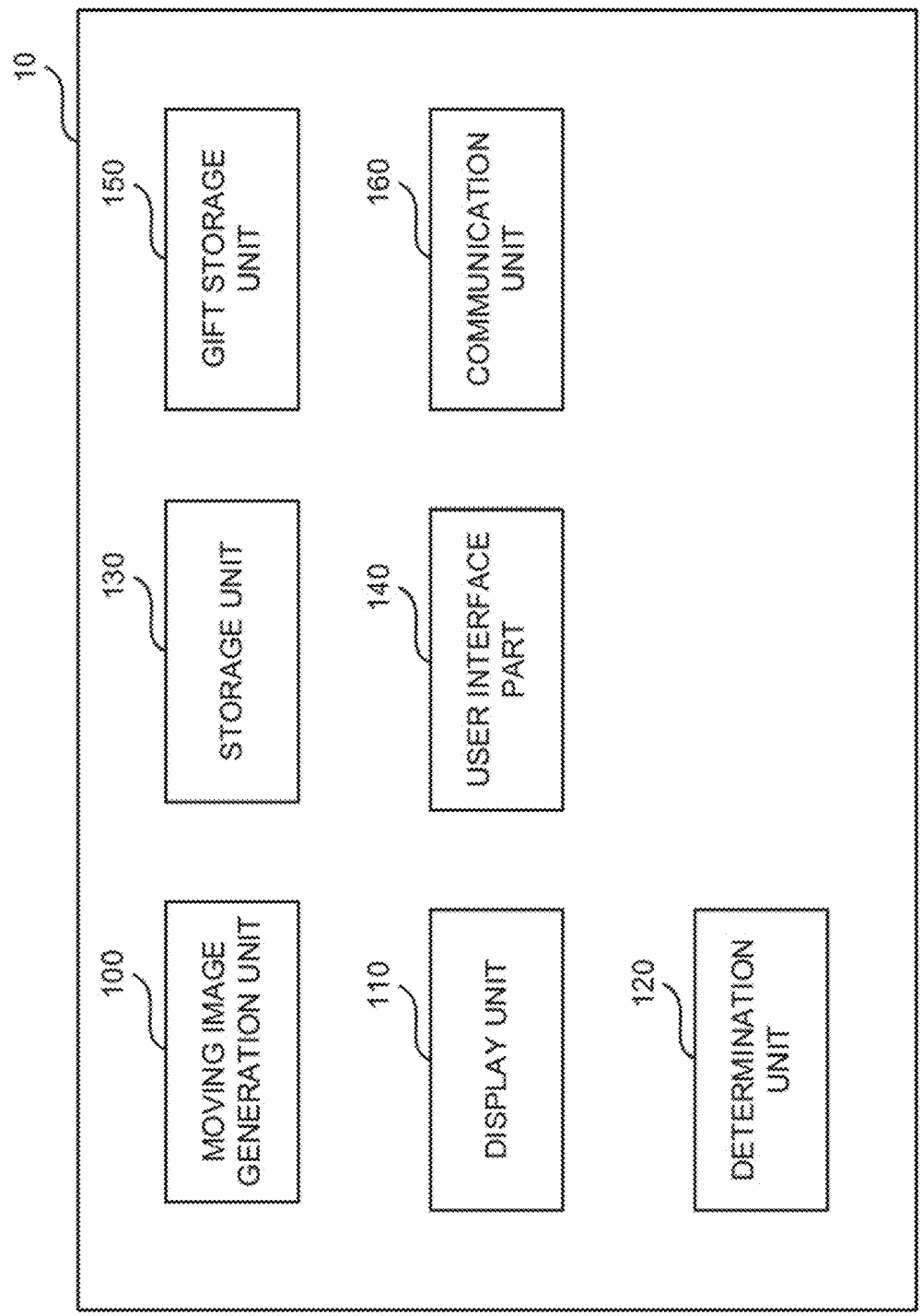
FIG. 3 is a functional block diagram schematically illustrating an example of the terminal device illustrated in FIG. 1.
Figure 4:
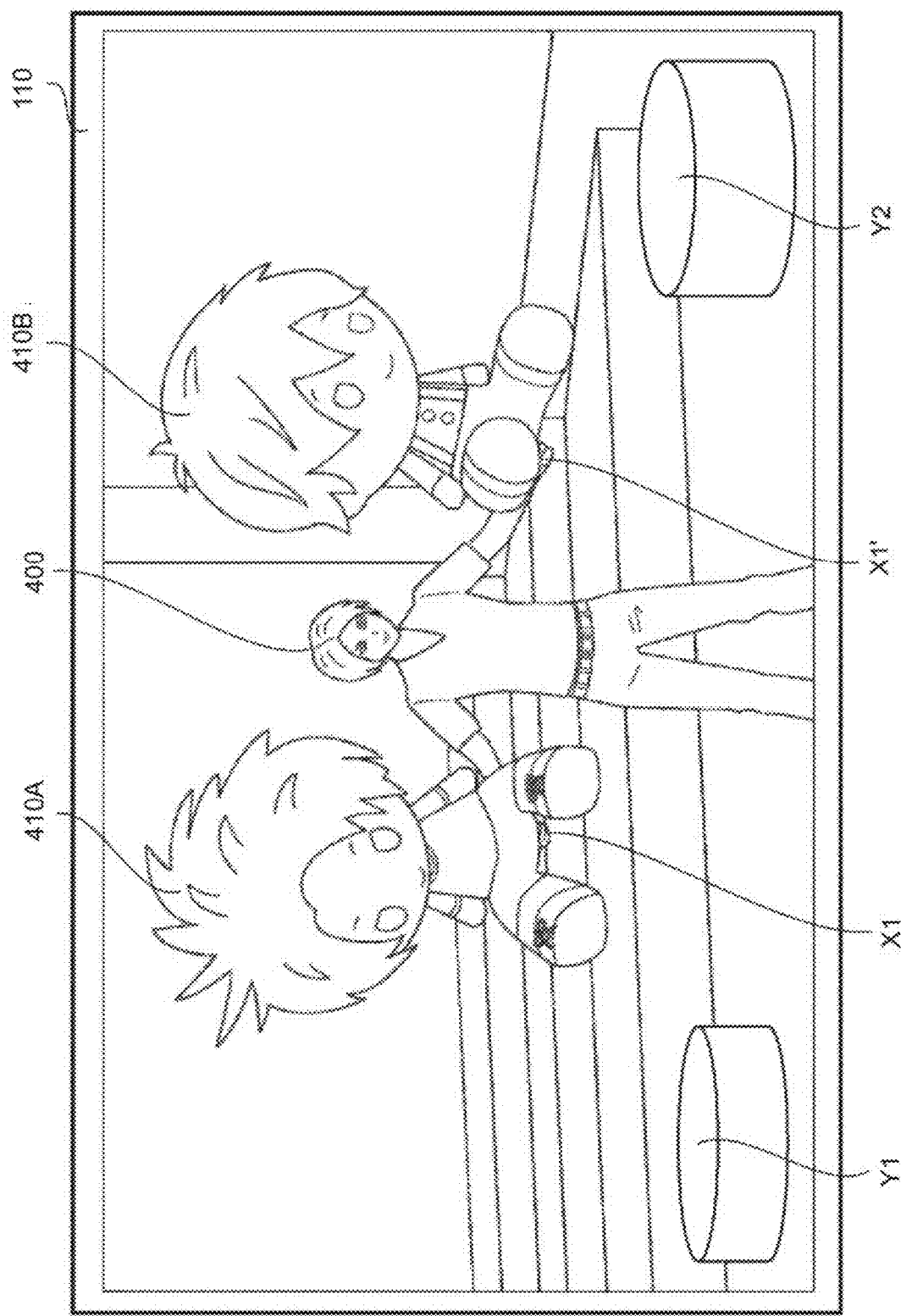
FIG. 4 is a diagram illustrating an example in which a first gift object is displayed on a moving image including an animation of an avatar object of a distribution user.
Figure 5:
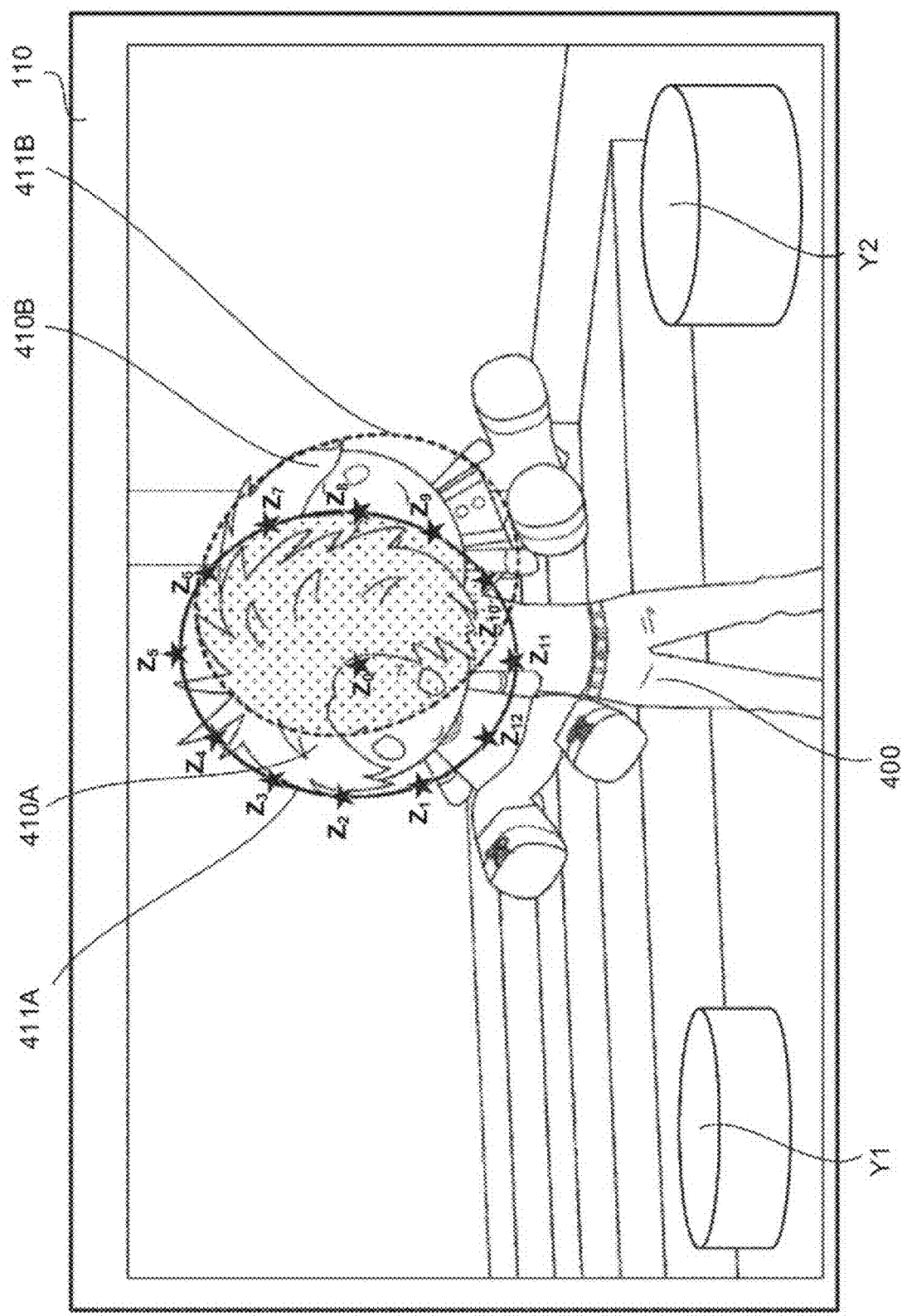
FIG. 5 is a diagram illustrating a case where the first gift object is displayed on the moving image including the animation of the avatar object of the distribution user and two first collision regions overlap with each other.
Figure 6:
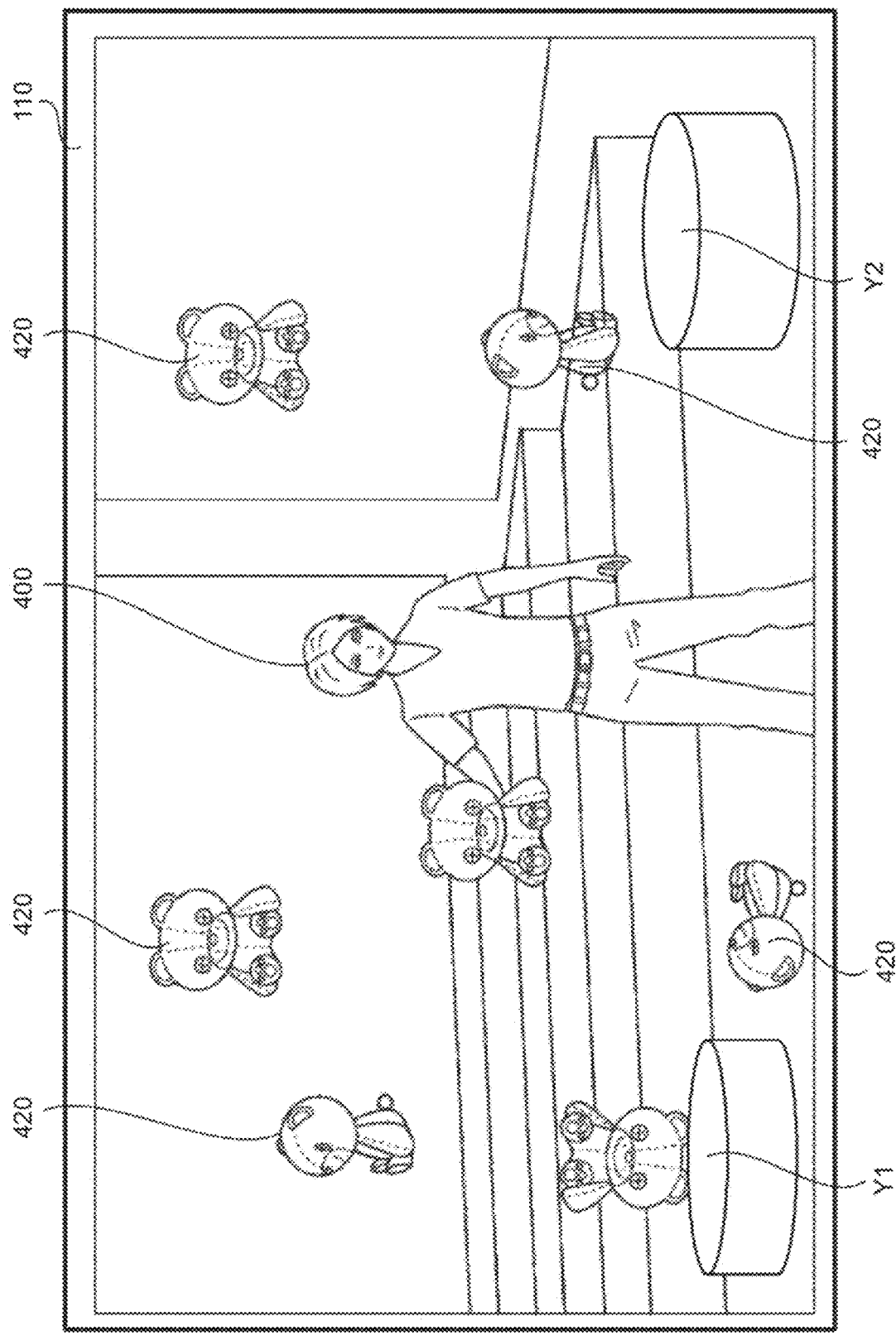
FIG. 6 is a diagram illustrating an example in which a second gift object is displayed on the moving image including the animation of the avatar object of the distribution user.
Figure 7:
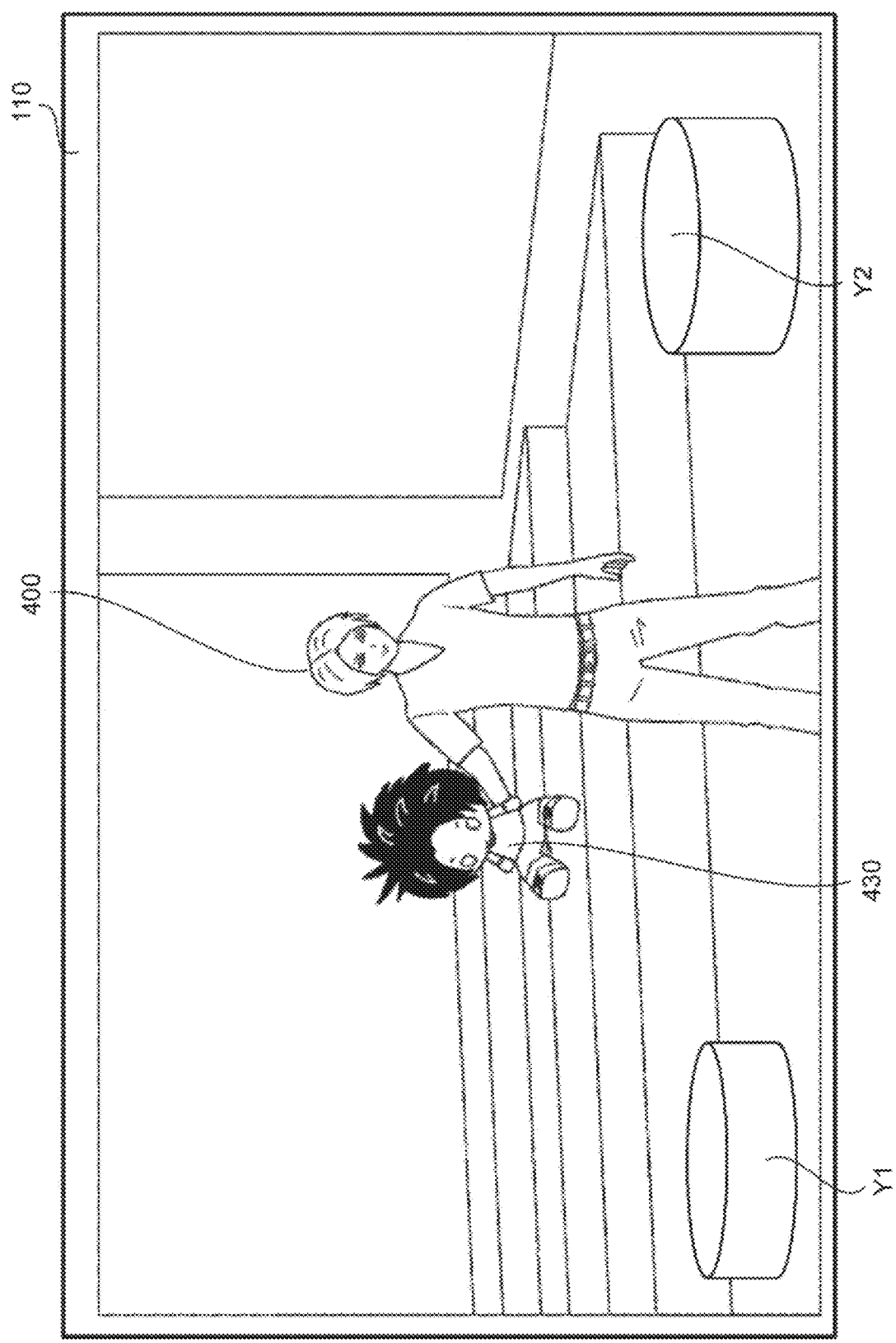
FIG. 7 is a diagram illustrating an example in which the second gift object is displayed on the moving image including the animation of the avatar object of the distribution user.
Figure 8:
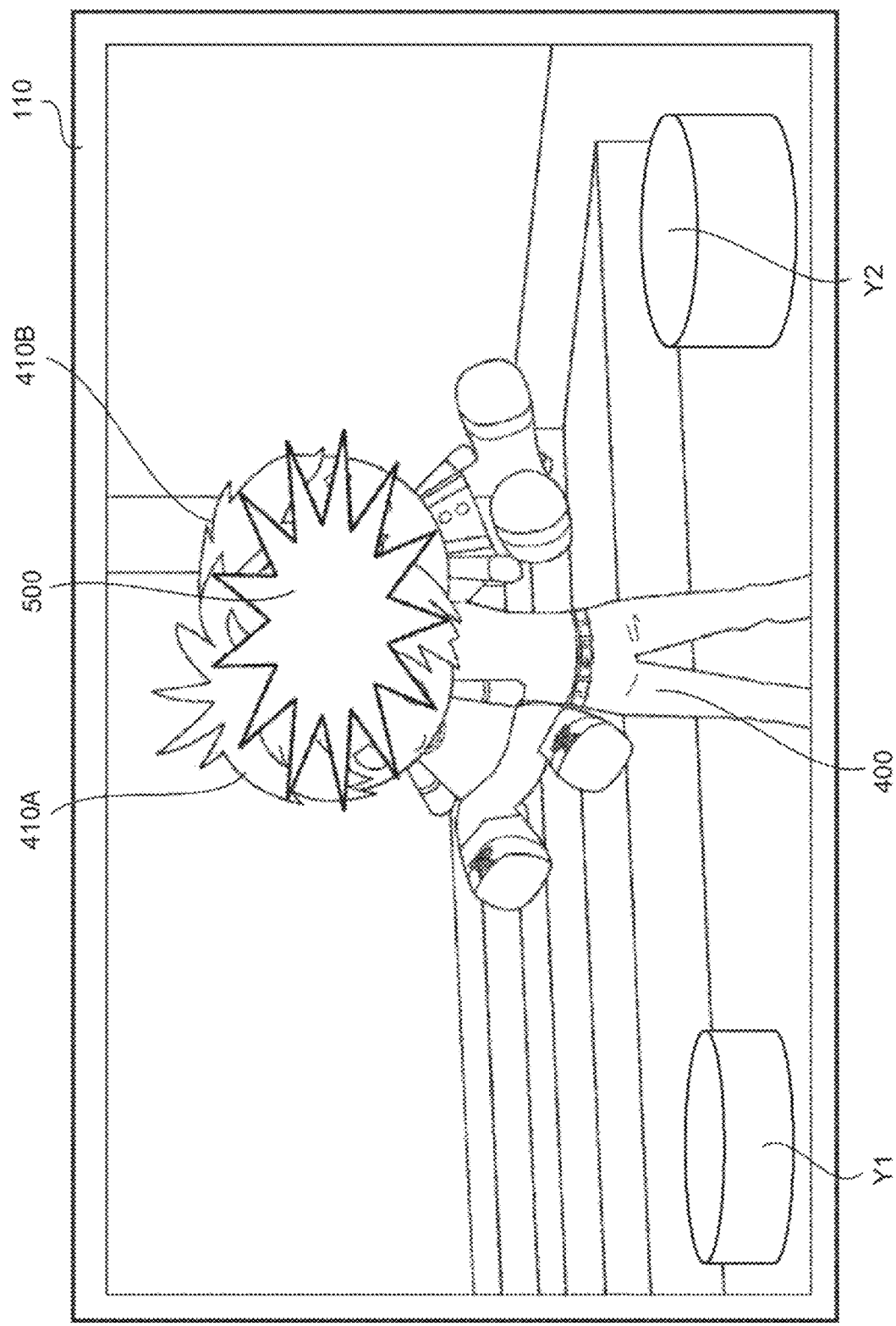
FIG. 8 is a diagram illustrating an example in which an effect object is displayed on the moving image including the animation of the avatar object of the distribution user.

An example of the function of the terminal device 10 will be described with reference to FIG. 3 to FIG. 8. FIG. 3 is a block diagram schematically illustrating an example of the function of the terminal device 10 illustrated in FIG. 1. FIG. 4 is a diagram illustrating an example in which the first gift object is displayed on the moving image including the animation of the avatar object of the distribution user. FIG. 5 is a diagram illustrating a case where the first gift object is displayed on the moving image including the animation of the avatar object of the distribution user and two first collision regions overlap with each other. FIG. 6 and FIG. 7 are diagrams illustrating an example in which the second gift object is displayed on the moving image including the animation of the avatar object of the distribution user. FIG. 8 is a diagram illustrating an example in which an effect object is displayed on the moving image including the animation of the avatar object of the distribution user.

As illustrated in FIG. 3, the terminal device 10 mainly includes a moving image generation unit 100, a display unit 110, a determination unit 120, a storage unit 130, a user interface part 140, a gift storage unit 150, and a communication unit 160.

(1) Moving Image Generation Unit 100

The moving image generation unit 100 is capable of generating the moving image including the animation of the avatar object of the distribution user based on the data relevant to the motion of the distribution user or the sound data relevant to the speech or the singing emanated by the distribution user. In order to attain this, the moving image generation unit 100, for example, is capable of including an acquisition unit (not illustrated) and a processing unit (not illustrated).

The acquisition unit is capable of including one or more first sensors (not illustrated) for acquiring data relevant to the face, the hands and feet, or the like (the entire body) of the distribution user, and one or more second sensors (not illustrated) for acquiring the sound data relevant to the speech or the singing emanated by the distribution user.

In a preferred embodiment, the first sensor is capable of including at least an RGB camera for imaging a visible light ray and a near-infrared ray camera for imaging a near-infrared ray. In addition, the first sensor is capable of including a motion sensor, a tracking sensor, or the like, described below. For example, an RGB camera or a near-infrared ray camera provided in a True Depth camera of iphone X (Registered Trademark) can be used as the RGB camera or the near-infrared ray camera described above. The second sensor is capable of including a microphone for recording a sound.

First, regarding the first sensor, the acquisition unit images the face, the hands and feet, or the like of the distribution user by using the first sensor (the camera provided in the first sensor) disposed close to the face, the hands and feet, or the like of the distribution user. Accordingly, the acquisition unit is capable of generating data in which an image acquired by the RGB camera is recorded over a unit time in association with a time code (a code indicating the acquired time) (for example, an MPEG file). Further, the acquisition unit is capable of generating data in which a numerical value indicating a predetermined number of (for example, 51) depths acquired by the near-infrared ray camera (for example, a numerical value of a floating decimal point) is recorded over a unit time in association with the time code (for example, a TSV file [a file in a format in which a plurality of data items are recorded by being separated with a tab]).

Regarding the near-infrared ray camera, specifically, a dot projector irradiates the face, the hands and feet, or the like of the distribution user who is a performer with an infrared ray laser that form a dot pattern, and the near-infrared ray camera captures an infrared ray dot that is reflected on the face of the distribution user, and generates an image of the captured infrared ray dot. The acquisition unit is capable of comparing the image of the dot pattern that is emitted from the dot projector registered in advance with the image that is captured by the near-infrared ray camera, and of calculating a depth of each point (each characteristic point) (a distance between each of the points/each of the characteristic points and the near-infrared ray camera) by using a positional shift at each of the points (each of the characteristic points) in both images (for example, each of 51 points/characteristic points). The acquisition unit is capable of generating data in which a numerical value indicating the depth calculated as described above is recorded over a unit time in association with the time code as described above.

Next, regarding the second sensor, the acquisition unit acquires a sound relevant to the speech or the singing emanated by the distribution user by using the second sensor disposed close to the distribution user. Accordingly, the acquisition unit is capable of generating data recorded over a unit time in association with the time code (for example, the MPEG file). In one embodiment, the acquisition unit is capable of acquiring the data relevant to the face or the hands and feet of the distribution user by using the first sensor and of acquiring the sound data relevant to the speech or the singing emanated by the distribution user by using the second sensor. In this case, the acquisition unit is capable of generating data in which the image that is acquired by the RGB camera and the sound data relevant to the speech or the singing emanated by the distribution user, which is acquired by using the second sensor, are recorded over a unit time in association with the same time code (for example, the MPEG file).

The acquisition unit is capable of outputting the data relevant to the face, the hands and feet, or the like of the distribution user (the MPEG file, the TSV file, and the like) or the sound data relevant to the speech or the singing emanated by the distribution user (the MPEG file and the like), which are generated as described above, to the processing unit.

Note that, here, a case has been described in which the first sensor includes the RGB camera and the infrared ray camera, but the first sensor, for example, may include any of (A) a camera for detecting an infrared ray that is emitted from an infrared ray laser and is reflected on the face, the hands and feet, or the like of the distribution user, (B) a plurality of RGB cameras for imaging a visible light ray, and (C) a single camera for imaging a visible light ray. In the case of (A) described above, the acquisition unit is capable of calculating the depth at each of the characteristic points in the face, the hands and feet, or the like of the distribution user by the same method as described above. In the case of (B) described above, the acquisition unit is capable of calculating the depth at each of the characteristic points in the face, the hands and feet, or the like of the distribution user by using a plurality of images that are imaged by a plurality of RGB cameras.

In the case of (C) described above, the acquisition unit is capable of calculating the depth at each of the characteristic points in the face, the hands and feet, or the like of the distribution user from an image that is imaged by a single camera, by using deep learning or the like. In addition, in the case of (C) described above, the acquisition unit may calculate the depth at each of the characteristic points in the face, the hands and feet, or the like of the distribution user by analysis processing (image processing or the like) with respect to the image that is imaged by the single camera.

In addition, the acquisition unit is capable of acquiring detection information relevant to the position or the direction of each site in the body of the distribution user by using the motion sensor or the tracking sensor provided in the first sensor, and of outputting the detection information to the processing unit. Note that, the details of the detection information relevant to the position or the direction of each of the sites in the body of the distribution user, which is acquired by using the motion sensor or the tracking sensor, will be described below.

The processing unit is capable of generating the moving image including the animation of the animation of the virtual character (the avatar object), based on the data relevant to the face, the hands and feet, or the like of the distribution user (and various information items relevant to the detection information or the like) from the acquisition unit. The processing unit is capable of allowing a rendering unit (not illustrated) to execute rendering with respect to the moving image itself of the avatar object by using various information items stored in a character data storage unit (not illustrated) (for example, geometry information, bone information, texture information, shader information, blend shape information, and the like), and thus, of generating the moving image of the avatar object.

Note that, in order to generate the moving image including the animation of the avatar object of the distribution user, based on the data relevant to the motion of the distribution user or the sound data relevant to the speech or the singing emanated by the distribution user, it is also possible to use other arbitrary known technologies.

However, in a case where the communication unit 160 described below receives the request information for displaying the first gift object on the moving image including the animation of the avatar object from the server device 20 (the information processing server 20B), in response to the gifting from the viewing user, the moving image generation unit 100 receives the request information through the communication unit 160, and displays the first gift object on the moving image including the animation of the avatar object (generates the moving image on which the first gift object is displayed), with reference to identification information relevant to the first gift object (a name/a shape/a color and the like), which is stored in the gift storage unit 150 described below and corresponds to the request information.

Specifically, in order to display the first gift object on the moving image with the gifting action from the viewing user as an opportunity, a first collision region corresponding to the shape of the first gift object is set in advance in each of the first gift objects, information relevant to each of the first gift objects and the first collision region corresponding thereto is stored in the gift storage unit 150 described below, along with information relevant to each of the first gift objects (a size/a shape/a color and the like). Further, in order to specify which position on the moving image the first gift object is displayed in, a position coordinate of a three-dimensional orthogonal coordinate system is set in each of the first gift objects, in the gifting. When the position coordinate is set, various objects such as the avatar object or the first gift object displayed in advance on the moving image, and position coordinates not overlapping with each other on the moving image are set. The position coordinates not overlapping with each other on the moving image indicates that a plurality of first collision regions set in each of the plurality of first gift objects to be displayed on the moving image do not overlap with each other and the first collision region does not overlap with a second collision region to be set in the avatar object (each of the sites of the avatar object) on the moving image or a third collision region to be set in other objects (for example, the second gift objects), and in order to satisfy such a condition, the moving image generation unit 100 sets a position coordinate relevant to a three-dimensional orthogonal coordinate (an X axis is a horizontal direction, a Y axis is a depth direction, and a Z axis is a vertical direction), in each of the first gift objects. Note that, the position coordinate indicates a position coordinate relevant to the X axis, the Y axis, and the Z axis corresponding to the center position of the first gift object (for example, in FIG. 5, a position coordinate corresponding to a center position Z0 of a first gift object 410A) or a position coordinate relevant to the X axis, the Y axis, and the Z axis corresponding to a plurality of positions forming the outer edge of the first collision region (for example, in FIG. 5, position coordinates corresponding to positions Z1 to Z12 forming the outer edge of a first collision region corresponding to the first gift object 410A). Each of the first gift objects is displayed on the moving image including the animation of the avatar object, based on the position coordinate (and the first collision region) set as described above. In addition, it is possible to determine whether or not the plurality of first collision regions overlap with each other, based on the position coordinate set as described above. Note that, it has been described that the position coordinate, the first collision region, and the second collision region to be set in each of the first gift objects are set in the three-dimensional orthogonal coordinate system, but may be set in a two-dimensional orthogonal coordinate system in a case where the moving image is two-dimensionally represented.

In addition, in a case where the determination unit 120 described below determines that the avatar object executes the predetermined action with respect to the first gift object displayed on the moving image, based on the motion of the distribution user, the moving image generation unit 100 receives a signal relevant to the determination from the determination unit 120, and displays the second gift object different from the first gift object on the moving image including the animation of the avatar object (generates the moving image on which the second gift object is displayed).

Specifically, in order to display the second gift object on the moving image with the determination of the determination unit 120 that the avatar object executes the predetermined action with respect to the first gift object displayed on the moving image, based on the motion of the distribution user, as an opportunity, the third collision region corresponding to the shape of each of the second gift objects is set in advance in each of the second gift objects and information relevant to each of the second gift objects and the third collision region corresponding thereto are stored in the gift storage unit 150 described below, along with information relevant to the second gift object (a size/a shape/a color and the like). Further, in order to specify which position on the moving image the second gift object is displayed in, a position coordinate of a three-dimensional orthogonal coordinate system is set in each of the second gift objects. When the position coordinate is set, various objects such as the avatar object or the first gift object displayed in advance on the moving image, and position coordinates not overlapping with each other on the moving image are set. As described above, the position coordinates not overlapping with each other on the moving image indicates that the third collision region does not overlap with the plurality of first collision regions to be set in each of the plurality of first gift objects to be displayed on the moving image or the second collision region to be set in the avatar object, and in order to satisfy such a condition, the moving image generation unit 100 sets a position coordinate relevant to a three-dimensional orthogonal coordinate (the X axis is the horizontal direction, the Y axis is the depth direction, and the Z axis is the vertical direction), in each of the second gift objects. Note that, as with the first gift object described above, the position coordinate indicates a position coordinate relevant to the X axis, the Y axis, and the Z axis corresponding to the center position of the second gift object or a position coordinate relevant to the X axis, the Y axis, and the Z axis corresponding to a plurality of positions forming the outer edge of the third collision region. Each of the second gift objects is displayed on the moving image including the animation of the avatar object, based on the position coordinate (and the third collision region) set as described above. Note that, it has been described that the position coordinate and the third collision region to be set in each of the second gift objects is set in the three-dimensional orthogonal coordinate, but they may be set in a two-dimensional orthogonal coordinate system in a case where the moving image is two-dimensionally represented.

However, as described above, when the second gift object is displayed on the moving image with the determination of the determination unit 120 that the predetermined action is executed, as an opportunity, various methods can be adopted with respect to the first gift object subjected to the predetermined action. For example, a configuration is adopted in which when the second gift object is displayed on the moving image, the first gift object subjected to the predetermined action is deleted from the moving image. In addition, a configuration may be adopted in which the first gift object subjected to the predetermined action is not deleted from the moving image, but the form of the first gift object (for example, a shape, a size, a color, and the like) is gradually changed with time (for example, a case where only the size of the first gift object is changed, a case where a part of the color of the first gift object is changed, and the like), and thus, the second gift object is generated (the second gift object is displayed on the moving image). In addition, both of the configurations described above may be adopted (for example, a configuration may be adopted in which in a case where the number of first gift objects subjected to the predetermined action is two, one first gift object of two first gift objects is deleted from the moving image, and the form of the other first gift object is gradually changed such that the second gift object is generated).

Note that, in a case where a predetermined condition is satisfied, the moving image generation unit 100 recognizes that the first gift object is gripped by the avatar object, and thus, as illustrated in FIG. 4, it is possible to generate a moving image of a state in which the first gift object is gripped by the avatar object. Here, the predetermined condition indicates a case where it is determined that the first collision region set in the first gift object and the second collision region set in the hand (or the fingers) of the avatar object overlap with each other in at least a part of the moving image and it is determined that the hand (or the fingers) of the avatar object is bent, based on the motion of the distribution user. Each determination may be executed by the moving image generation unit 100, or may be executed by a different constituent, and then, each determination result may be transmitted to at least the moving image generation unit 100. Note that, a method for determining that the hand (or the fingers) of the avatar object is bent can be executed based on a signal of a controller described below. Note that, the same applies to the second gift object in that the second gift object is gripped by the avatar object. That is, in a case where it is determined that the third collision region set in the second gift object and the second collision region described above overlap with each other in at least a part of the moving image and it is determined that the hand (or the fingers) of the avatar object is bent, the second gift object is gripped by the avatar object.

Note that, the determination relevant to whether or not the plurality of first collision regions overlap with each other and whether or not the first collision region and the second collision region overlap with each other is executed based on a plurality of position coordinates relevant to the X axis, the Y axis, and the Z axis corresponding to the outer edge of each of the collision regions.

As described above, when the second gift object is displayed on the moving image with the determination of the determination unit 120 that the predetermined action is executed, as an opportunity, the moving image generation unit 100 determines which second gift object is displayed on the moving image, with reference to a setting condition to be stored in the gift storage unit 150 described below. In a first case, the setting condition, for example, is a condition for associating which second gift object corresponds thereto in accordance with various combinations including the type of first gift object subjected to the predetermined action, the number of applications for each type of first gift object subjected to the predetermined action, and a specific position described below (in FIG. 4, a specific position Y1 or Y2). In addition, in a second case, the setting condition is information for associating which second gift object corresponds thereto in accordance with various combinations including the type of first gift object subjected to the predetermined action and the number of first gift objects (the number of applications) in a case where at least one gift object is brought into contact with another first gift object.

When a specific example of the first case of the setting condition described above is described with reference to a case illustrated in FIG. 4, in a case where the type of first gift object subjected to the predetermined action is a "stuffed toy boy" (a reference numeral 410A in FIG. 4), the number of applications for each type of first gift object subjected to the predetermined action (the "stuffed toy boy" 410A) is "one", and the specific position is "Y1", as illustrated in FIG. 6, a plurality of "small teddy bears" (a reference numeral 420 in FIG. 6) are set in advance, as the second gift object. Similarly, in the case of FIG. 4, in a case where the type of first gift object subjected to the predetermined action is a "stuffed toy boy" (a reference numeral 410B in FIG. 4), the number of applications for each type of first gift object subjected to the predetermined action ("the stuffed toy boy" 410B) is "one", and the specific position is "Y2", one "big stuffed toy elephant" (not illustrated) is set in advance, as the second gift object. Various conditions relevant to such a setting condition may be suitably changed, and for example, are stored in the gift storage unit 150 in a table format.

On the other hand, when a specific example of the second case of the setting condition described above is described with reference to a case illustrated in FIG. 5, in a case where the type of first gift object subjected to the predetermined action and the number of first gift objects are "one" "stuffed toy boy" 410A and "one" "stuffed toy boy" 410B, as illustrated in FIG. 7, one "small stuffed toy boy" (a reference numeral 430 in FIG. 7) is set in advance, as the second gift object. As described above, various conditions relevant to such a setting condition may be suitably changed, and for example, a contact time between the first gift objects or a collision rate when the first gift objects are in contact with each other may be set as a condition (specifically, when the collision rate is greater than or equal to a km/h, a "stuffed toy cheetah" is displayed as the second gift object, and when the collision rate is less than a km/h, a "stuffed toy turtle" is displayed as the second gift object), or a relative position when a plurality of first gift objects subjected to the predetermined action are in contact with each other (for example, in the case illustrated in FIG. 5, the type of second gift object to be displayed is different in accordance with a case where the "stuffed toy boy" 410A is on an upper side from the "stuffed toy boy" 410B and a case where the "stuffed toy boy" 410A is on a lower side from the "stuffed toy boy" 410B, in the contact) may be set as a condition. In addition, such a setting condition, for example, is stored in the gift storage unit 150 in a table format.

Note that, a condition indicating which position on the moving image the second gift object to be displayed on the moving image (for example, the plurality of "small teddy bears" 420 relevant to FIG. 6 and the "small stuffed toy boy" 430 relevant to FIG. 7) is displayed in can also be included in the first setting condition and the second setting condition described above. Specifically, in the case of FIG. 6, information relevant to an individual position coordinate relevant to the X axis, the Y axis, and the Z axis is set in advance in each of the plurality of "small teddy bears" 420 as the second gift object such that the plurality of "small teddy bears" are separately arranged over a plurality of portions on the moving image (that is, a position in which the second gift object is displayed is also displayed in a position different from the position in which the first gift object subjected to the predetermined action has existed). On the other hand, in the case of FIG. 7, a position coordinate in which the first gift object (for example, the "stuffed toy boy" 410A) has existed and information relevant to the same position coordinate are set in advance in the "small stuffed toy boy" 430 as the second gift object.

Further, when the second gift object is displayed on the moving image with the determination of the determination unit 120 that the predetermined action is executed, as an opportunity, as illustrated in FIG. 8, the moving image generation unit 100 may display an effect object 500 indicating a state in which the second gift object is being displayed on the moving image (a state immediately before the second gift object is displayed) on the moving image. In this case, the moving image generation unit 100 displays the effect object 500 on the moving image with a time point when the determination unit 120 determines that the predetermined action (in FIG. 8, the "stuffed toy boy" 410A that is the first gift object is in contact with the "stuffed toy boy" 410B that is another first gift object) is executed, as an opportunity, and deletes the effect object 500 from the moving image with a time point when the second gift object is actually displayed on the moving image, as an opportunity. In addition, the moving image generation unit 100 is capable of displaying the effect object 500 at a position coordinate in which two first collision regions overlap with each other, with reference to the position coordinate in which two first collision regions (for example, the first collision regions 411A and 411B in FIG. 5) overlap with each other.

(2) Display Unit 110

The display unit 110 is capable of displaying various information items necessary for distributing or viewing the moving image (including the moving image on which the first gift object is displayed and the moving image on which the second gift object is displayed). For example, the display unit 110 is capable of displaying the moving image to be distributed, the received moving image, or the generated moving image. In addition, the display unit 110 is also capable of displaying various comments to be distributed to each of the terminal devices 10 from the server device 20, along with the received moving image. In addition, gift information (the information relevant to the first gift object) stored in the gift storage unit 150 can also be suitably displayed in accordance with the manipulation of the viewing user.

(3) Determination Unit 120

The determination unit 120 determines whether or not the avatar object executes the predetermined action with respect to the first gift object displayed on the moving image, based on the motion of the distribution user, in a state in which one or a plurality of first gift objects are displayed on the moving image including the animation of the avatar object (a state in which the moving image on which one or a plurality of first gift objects are displayed is generated), by the moving image generation unit 100. Here, the predetermined action, for example, is capable of including an action for the avatar object to move the first gift object to a specific position in the moving image, and an action for the avatar object to allow at least one first gift object to be in contact with, to slide, or to collide with another first gift object. Note that, both of the actions described above are based on the motion of the distribution user.

As described above, a unique (corresponding to the form of the first gift object) first collision region is set in advance in each of the first gift objects, the second collision region is set in advance in the hand (or the fingers) of the avatar object, and in a case where the predetermined condition described above is satisfied, the first gift object is gripped by the avatar object. Note that, the avatar object is capable of gripping essentially two first gift objects with the hands, but is not necessarily limited thereto. For example, the avatar object may grip three or more first gift objects with the hands, and in a case where a plurality of avatar objects are displayed in the moving image, four or more first gift objects can be gripped by the avatar object.

As illustrated in FIG. 4, in a case where an avatar object 400 moves the first gift object 410A (or 410B) to a second position Y1 (or a second position Y2) that is a position different from a first position X1 (or a first position X1') while maintaining a state in which the avatar object 400 grips the first gift object 410A (or 410B) in the first position X1 (or the first position X1'), based on the motion of the distribution user, with the gripped state as a starting point, the determination unit 120 determines that the action for moving the first gift object to the specific position in the moving image is executed. In this case, the second position Y1 (or the second position Y2) is the specific position. Note that, the first position X1 (or the first position X1') is suitably changed in any position on the moving image. In addition, the second position Y1 (or the second position Y2) may be set in advance by an XYZ coordinate system in any position on the moving image.

In addition, in a case where the avatar object 400 brings two first gift objects 410A and 410B into contact with each other based on the motion of the distribution user, as illustrated in FIG. 5, with a state in which the avatar object 400 grips two first gift objects 410A and 410B with the hands, as a starting point, as illustrated in FIG. 4, the determination unit 120 determines that the predetermined action is executed. Here, two first gift objects 410A and 410B being in contact with each other indicates that the first collision regions 411A and 411B to be set in each of two first gift objects 410A and 410B overlap with each other at least partially. In addition, two first gift objects 410A and 410B being in contact with each other also includes an aspect in which both of the first gift objects slide or collide with each other.

However, the first collision regions 411A and 411B to be set in each of two first gift objects 410A and 410B overlapping with each other at least partially is determined based on a position coordinate relevant to the X axis, the Y axis, and the Z axis corresponding to the first collision regions 411A and 411B, as described above.

(4) Storage Unit 130

The storage unit 130 is capable of storing various information items necessary for distributing or viewing the moving image (including the moving image on which the first gift object is displayed and the moving image on which the second gift object is displayed).

(5) User Interface Part 140

The user interface part 140 is capable of inputting various information items necessary for distributing or viewing the moving image (including the moving image on which the first gift object is displayed and the moving image on which the second gift object is displayed) through the manipulation of the distribution user or the viewing user.

For example, the user interface part 140 is capable of inputting manipulation data indicating the contents of the manipulation of the viewing user relevant to the gifting with respect to the avatar object (including a manipulation such as selecting a command selecting any first gift object from a plurality of first gift objects prepared in advance and for applying the first gift object to the avatar object) or data indicating the contents of comment information with respect to the distribution user (the avatar object) from the viewing user (for example, comment information to be a hint for a predetermined action of "Bump two stuffed toy boys in hands against each other!" of the viewing user with respect to the distribution user), from the viewing user, and of outputting such various data items to the communication unit 160. Note that, the manipulation data described above, for example, is capable of including information indicating which first gift object (the type of first gift object) is gifted to the distribution user by the viewing user.

(6) Gift Storage Unit 150

In a case where the moving image distribution application and the moving image viewing application are installed in the terminal device 10, the gift storage unit 150 is capable of storing the gift information to be set in advance in such applications. Note that, the gift information is capable of including identification information such as the name/the shape/the color and the like of the first gift object and the second gift object, and information relevant to the amount of each first gift object to be billed to the viewing user in a case where the viewing user gifts the first gift object.

Note that, information relevant to the above-described first collision region and the third collision region corresponding to each of the first gift object and the second gift object is also included in the identification information described above.

In addition, when the second gift object is displayed on the moving image with the determination of the determination unit 120 that the predetermined action is executed, as an opportunity, the gift storage unit 150 stores the setting condition described above that the moving image generation unit 100 refers to.

(7) Communication Unit 160

The communication unit 160 is capable of communicating various information items necessary for distributing or viewing the moving image (including the moving image on which the first gift object is displayed and the moving image on which the second gift object is displayed), with respect to the server device 20. For example, in a case where the terminal device 10 motions as the terminal device 10 of the distribution user, the communication unit 160 is capable of receiving the request information for displaying the first gift object on the moving image including the animation of the avatar object from the server device 20 (the information processing server device 20B), and of transmitting the generated moving image to the server device 20 (the distribution server device 20C).

In addition, in a case where the moving image generation unit 100 displays the second gift object on the moving image in accordance with the determination of the determination unit 120 that the predetermined action is executed, the communication unit 160 is capable of transmitting the moving image on which the second gift object is displayed to the server device 20 (the distribution server device 20C). As described above, the communication unit 160 is capable of receiving various moving images that are generated by the moving image generation unit 100 from the moving image generation unit 100, and of transmitting various moving images to the server device 20 (the distribution server device 20C).

On the other hand, in a case where the terminal device 10 motions as the terminal device 10 of the viewing user, the communication unit 160 is capable of receiving the moving image generated by the terminal device 10 of the distribution user from the server device 20. In addition, similarly, in a case where the terminal device 10 motions as the terminal device 10 of the viewing user, the information relevant to the gifting with respect to the distribution user (the avatar object) from the viewing user and the information relevant to the comment with respect to the distribution user (the avatar object) from the viewing user can be transmitted to the server device 20 (the comment API server device 20D).

(8) Studio Unit

A studio unit (not illustrated) including the moving image generation unit 100, the display unit 110, the determination unit 120, the storage unit 130, the user interface part 140, the gift storage unit 150, and the communication unit 160, described above, can be used as the terminal device 10.

The studio unit can be mounted by an information processing device such as a personal computer, and is capable of mainly including a central processing unit, a main storage device, an input/output interface, an input device, an auxiliary storage device, and an output device, as with the terminal device 10 and the server device 20 described above. Such devices are connected to each other by a data bus or a control bus. In addition, the studio unit functions as an information processing device for executing a specific application that is installed, and thus, is capable of generating the moving image including the animation of the avatar object, based on the data relevant to the motion of the distribution user or the data relevant to the speech or the singing emanated by the distribution user who is in a studio room (not illustrated) in which the studio unit is provided.

Most of the constituents of the moving image generation unit 100 of the studio unit are arranged in the studio room. In addition, in the studio room, the distribution user performs various performances, and the studio unit detects the motion, the neutral expression, the speech (including the singing), and the like of the distribution user.

The distribution user is a target from which the motion, the neutral expression, the speech (including the singing), and the like are captured by various sensor groups of the studio unit (the moving image generation unit 100). In this case, it is not necessary that the distribution user is a human, and for example, may be an independently movable robot. In addition, the number of distribution users in the studio room may be 1, or may be greater than or equal to 2.

The moving image generation unit 100 of the studio unit is capable of including various motion sensors (not illustrated) to be mounted on a plurality of sites of the distribution user (for example, the wrist, the instep, the waist, the vertex, and the like), a controller (not illustrated) to be gripped by the hand of the distribution user, and a camera (not illustrated) to be attached to the head of the distribution user through a mounting fixture (not illustrated). In addition, in the studio unit, in order to acquire the sound data of the distribution user, a microphone is provided on the mounting fixture described above or any place in the studio room (for example, the wall, the bottom, the ceiling, and the like). Further, the studio unit is capable of including a plurality of base stations (not illustrated), a tracking sensor (not illustrated), and a display (not illustrated), in addition to the configuration described above.

The motion sensor described above is capable of detecting the position and the direction of the distribution user, in cooperation with the base station described above. In one embodiment, the plurality of base stations are a multiaxis laser emitter, and one base station, for example, scans laser light around a vertical axis, and the other base station, for example, scans laser light around a horizontal axis, after emitting blinking light for synchronization. The motion sensor includes a plurality of light sensors sensing the incidence of the blinking light and the laser light from the base station, and is capable of detecting a temporal difference between an incidence timing of the blinking light and an incidence timing of the laser light, a light receiving time of each of the light sensors, an incidence angle of the laser light, which is sensed by each of the light sensors, and the like. The motion sensor, for example, may be Vive Tracker that is provided from HTC CORPORATION, or may be Xsens MVN Analyze that is provided from ZERO C SEVEN Inc.

The moving image generation unit 100 of the studio unit acquires detection information indicating the position and the direction of each of the motion sensors which are calculated in the motion sensor. The motion sensor is mounted on a site such as the wrist, the instep, the waist, and the vertex of the distribution user, and thus, is capable of detecting the motion of each site of the body of the distribution user by detecting the position and the direction of the motion sensor. Note that, the detection information indicating the position and the direction of the motion sensor is calculated as a position coordinate value of an XYZ coordinate system for each site of the body of the distribution user in the moving image (in a virtual space included in the moving image). The X axis corresponds to the horizontal direction in the moving image, the Y axis corresponds to the depth direction in the moving image, and the Z axis corresponds to the vertical direction in the moving image. Therefore, all motions of each site of the body of the distribution user are also detected as the position coordinate value of the XYZ coordinate system.

In one embodiment, a plurality of infrared LEDs may be mounted on the plurality of motion sensors, and light from the infrared LED may be sensed by an infrared ray camera provided on the bottom or the wall of the studio room, and thus, the position and the direction of the motion sensor may be detected. In addition, a visible light LED may be used instead of the infrared LED, and light from the visible light LED may be sensed by a visible light camera, and thus, the position and the direction of the motion sensor may be detected.

In one embodiment, a plurality of reflection markers can also be used instead of the motion sensor. The reflection marker pressure-sensitively adheres to the distribution user by a pressure-sensitive adhesive tape or the like. As described above, photographing data may be generated by photographing the distribution user to which the reflection marker pressure-sensitively adheres, and the photographing data may be subjected to image processing, and thus, the position and the direction of the reflection marker (as described above, the position coordinate value of the XYZ coordinate system) may be detected.

The controller outputs a control signal according to the manipulation of the distribution user such as the bending of the fingers, and the moving image generation unit 100 acquires the control signal.

The tracking sensor generates tracking information for determining setting information of a virtual camera for constructing the virtual space included in the moving image. The tracking information is calculated as a position in a three-dimensional orthogonal coordinate system and an angle around each axis, and the moving image generation unit 100 acquires the tracking information.

The camera to be attached to the head of the distribution user is disposed to be capable of imaging the face of the distribution user. The camera continuously images the face of the distribution user, and thus, acquires imaging data of the face of the distribution user, and the moving image generation unit 100 acquires the imaging data from the camera. Note that, the camera may be a 3D camera that is capable of detecting the depth of the face of the distribution user.

The display functions as the display unit 110, and is disposed in a position that is visible to the distribution user, and thus, the distribution user is capable of viewing the moving image that the moving image generation unit 100 generates by acquiring various information items through the display.

The moving image generation unit 100 is capable of acquiring the information from the motion sensor, the tracking sensor, various cameras, the controller, and the like, described above, and of generating the moving image including the animation of the avatar object.

In addition, the studio unit is capable of including the moving image generation unit 100, the display unit 110, the determination unit 120, the storage unit 130, the user interface part 140, the gift storage unit 150, and the communication unit 160, described above (or other constituents having the functions thereof), in addition to the constituents and the functions thereof, described above. Accordingly, the determination relevant to the predetermined action described above, the display of the first gift object or the second gift object on the moving image including the animation of the avatar object, or the like can be executed. The constituents of the studio unit as described above are an example, and the studio unit is capable of including various other applicable constituents.

3-2. Function of Server Device 20

Figure 9:
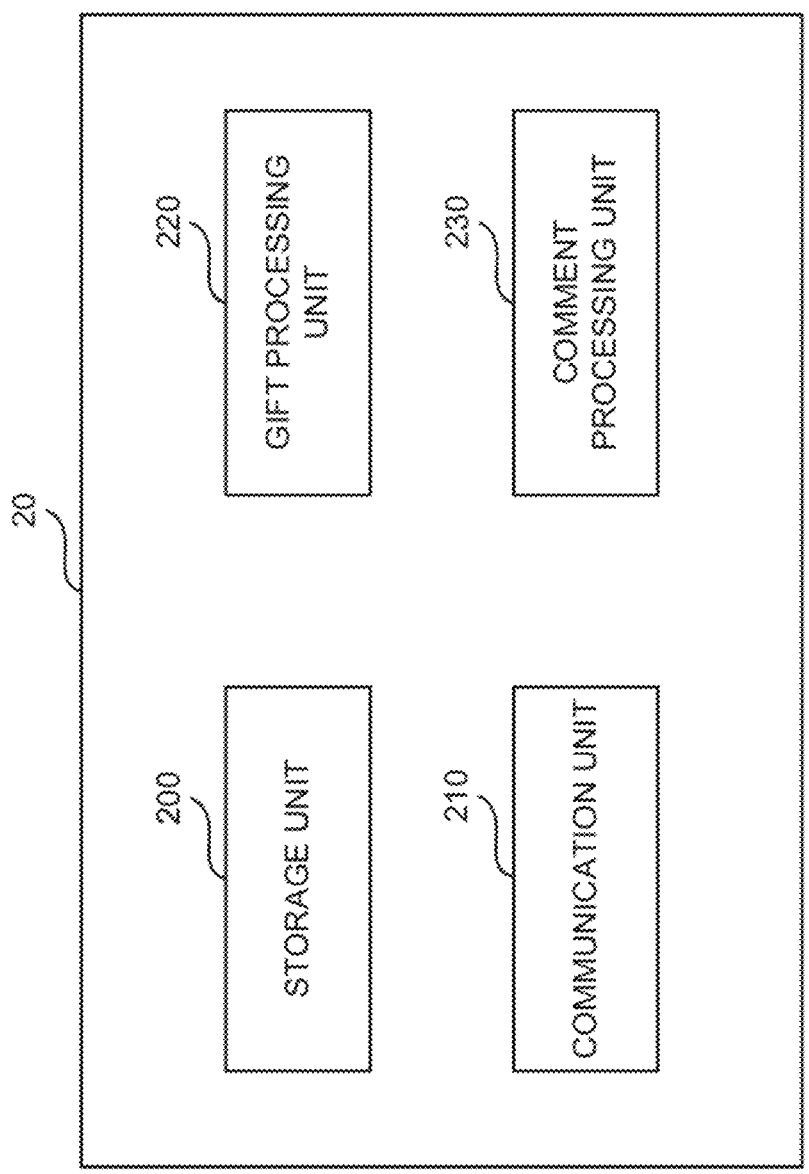
FIG. 9 is a block diagram schematically illustrating an example of a function of the server device illustrated in FIG. 1.

An example of the function of the server device 20 will be described with reference to FIG. 9. FIG. 9 is a block diagram schematically illustrating an example of the function of the server device 20 illustrated in FIG. 1.

As illustrated in FIG. 9, the server device 20 is capable of mainly including a storage unit 200, a communication unit 210, a gift processing unit 220, and a comment processing unit 230.

(1) Storage Unit 200

The storage unit 200 is capable of storing various information items necessary for distributing or viewing the moving image (including the moving image on which the first gift object is displayed and the moving image on which the second gift object is displayed).

(2) Communication Unit 210

The communication unit 210 is capable of communicating various information items necessary for distributing or viewing the moving image (including the moving image on which the first gift object is displayed and the moving image on which the second gift object is displayed), with respect to the terminal device 10 of the distribution user or the terminal device 10 of the viewing user. For example, the communication unit 210 is capable of receiving the moving image (including the moving image on which the first gift object is displayed and the moving image on which the second gift object is displayed) from the terminal device 10 of the distribution user and of distributing the moving image to the terminal devices 10 of each of the viewing users.

In addition, in a case where the information relevant to the gifting with respect to the distribution user (the avatar object) from the viewing user and the information relevant to the comment with respect to the distribution user (the avatar object) from the viewing user are received from the terminal device 10 of the viewing user, the communication unit 210 outputs the information relevant to the gifting to the gift processing unit 220 and the information relevant to the comment to the comment processing unit 230, respectively.

In addition, the communication unit 210 is capable of obtaining the information relevant to the first gift object, which is read by the gift processing unit 220, from the gift processing unit 220, and of transmitting the request information for displaying the first gift object on the moving image including the animation of the avatar object to the terminal device 10 of the distribution user. Note that, the information relevant to the first gift object that is obtained from the gift processing unit 220 by the communication unit 210 may be information capable of specifying which information of the first gift object in information items relevant to the plurality of first gift objects, stored in the gift storage unit 150, the moving image generation unit 100 of the terminal device 10 of the distribution user preferably refers to. For example, in a case where the "stuffed toy boy" is gifted from the terminal device 10 of the viewing user, as the first gift object, the communication unit 210 may be only the name of the first gift object that is the "stuffed toy boy" (or a character string similar to the name, and the like) from the gift processing unit 220.

In addition, the communication unit 210 is also capable of receiving the information indicating that it is determined that the avatar object executes the predetermined action with respect to the first gift object and the second gift object is displayed on the moving image from the terminal device 10 of the distribution user, and of outputting the information to the comment processing unit 230.

(3) Gift Processing Unit 220

In a case where the information relevant to the gifting is received from the communication unit 210, the gift processing unit 220 reads the identification information of the viewing user executing the gifting action (the serial numbers of the terminal devices 10 of each of the viewing users, the ID information to be applied to each of the viewing users, or the like), the information relevant to the gifted first gift object (the identification information such as the name/the size/the shape/the color of the first gift object), and the identification information of the distribution user who is the avatar object as a gifting target (the serial number of the terminal device 10 of the distribution user, the ID information to be applied to the distribution user, or the like).

Note that, regarding the first gift object, the gift processing unit 220 may read only the information capable of specifying which information of the first gift object in the information items relevant to the plurality of first gift objects, stored in the gift storage unit 150, the moving image generation unit 100 of the terminal device 10 of the distribution user preferably refers to (for example, as described above, the name of the first gift object, the character string similar to the name, or the like), and may not necessarily read the identification information such as the size, the shape, and the color of the first gift object. In addition, information relevant to the first collision region corresponding to each of the first gift objects is not read by the gift processing unit 220, but is stored in the gift storage unit 150 described above.

Note that, various information items read by the gift processing unit 220 are output to the storage unit 200, and are stored in the storage unit 200.

(4) Comment Processing Unit 230

The comment processing unit 230 is capable of receiving the comment information with respect to the distribution user (the avatar object) from the viewing user (for example, including the comment information to be a hint for the predetermined action of "Bump two stuffed toy boys in hands against each other!" of the viewing user with respect to the distribution user), from the terminal device 10 of the viewing user through the communication unit 210, and of distributing the comment information from the viewing user to each of the viewing users viewing the same moving image.

In addition, the comment processing unit 230 is capable of preparing comment information corresponding to all or a part of information indicating which viewing user gifts which first gift object to the avatar object (for example, comment information of "The viewing user X has gifted a "stuffed toy boy"!"), with reference to various information items (the information stored in the storage unit 200) read by the gift processing unit 220, and is capable of distributing the comment information to each of the viewing users viewing the same moving image.

In addition, in a case where information indicating that the second gift object is displayed on the moving image is received from the communication unit 210, the comment processing unit 230 is also capable of preparing comment information corresponding to the information (for example, comment information of "Many "small teddy bears" have appeared!"), and of distributing the comment information to each of the viewing users viewing the same moving image.

In addition, the comment processing unit 230 is capable of self-preparing comment information to be a hint for a predetermined action with respect to the gifted first gift object (for example, comment information of "Arrange two "stuffed toy boys" up and down close together!"), with reference to various information items read by the gift processing unit 220, regardless of whether or not the comment information with respect to the distribution user (the avatar object) from the viewing user is received from the terminal device 10 of the viewing user through the communication unit 210, and of distributing the comment information to each of the viewing users viewing the same moving image.

4. Overall Motion of Moving Image Distribution System 1

Figure 10:
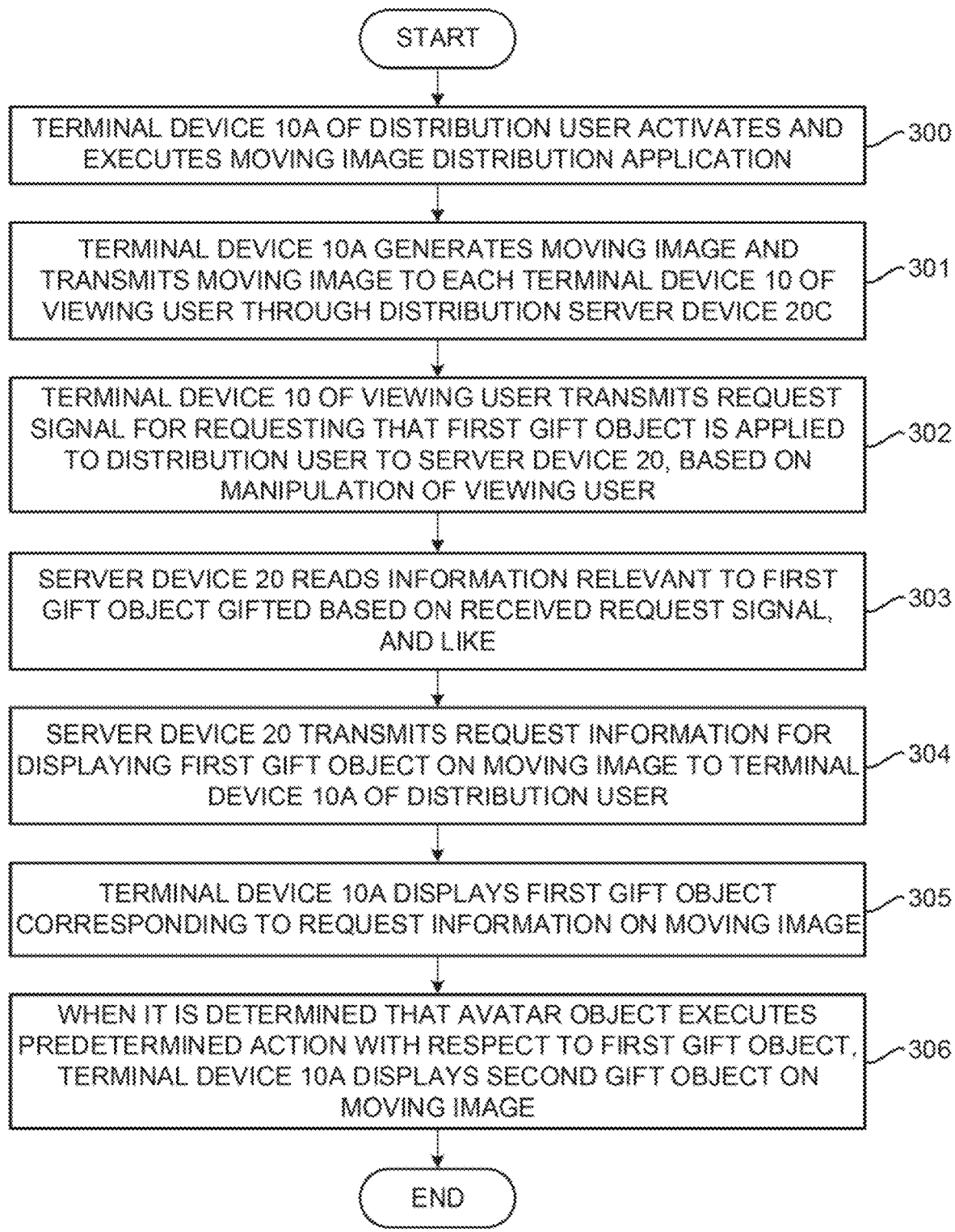
FIG. 10 is a flowchart illustrating an example of a motion that is performed in the moving image distribution system illustrated in FIG. 1.

Next, the overall motion that is performed in the moving image distribution system 1 having the configuration described above will be described with reference to FIG. 10. FIG. 10 is a flowchart illustrating an example of the motion that is performed in the moving image distribution system 1 illustrated in FIG. 1.

First, in step (hereinafter, referred to as "ST") 300, the terminal device 10 (here, the terminal device 10A) activates and executes the moving image distribution application, in accordance with the manipulation of the distribution user.

Next, in ST301, the terminal device 10A generates the moving image including the animation of the avatar object of the distribution user, based on the data relevant to the motion of the distribution user or the sound data relevant to the speech or the singing emanated by the distribution user. Accordingly, the moving image including the animation of the avatar object 400 of the distribution user (for example, in FIG. 4, the moving image in a state where the first gift objects 410A and 410B are displayed) is displayed on the display unit 110 of the terminal device 10A.

Further, the terminal device 10A transmits the generated moving image to the distribution server device 20C of the server device 20. The distribution server device 20C distributes the moving image that is received from the terminal device 10A to the terminal devices 10 of each of the viewing users (here, the terminal device 10B, the terminal device 10C, and the terminal device 10D) executing the moving image viewing application. Accordingly, the same moving image is also displayed on the display unit 110 of the terminal devices 10 of each of the viewing users.

Next, in ST302, the terminal device 10 of the viewing user transmits the request signal for requesting that the first gift object is applied to the distribution user (the avatar object), to the server device 20 (the gift API server device 20A), based on the manipulation of the viewing user with respect to the user interface part 140.

Next, in ST303, the server device 20 (the gift API server device 20A) receiving the request signal relevant to the first gift object from the terminal device 10 of the viewing user reads the identification information of the viewing user executing the gifting action, the information relevant to the gifted first gift object, and the identification information of the distribution user who is the avatar object as a gifting target.

Then, in ST304, the server device 20 (the information processing server device 20B) transmits the request information for displaying the first gift object on the moving image including the animation of the avatar object to the terminal device 10 of the distribution user, based on the read information. At this time, the information processing server device 20B acquires at least a part of the information relevant to the first gift object (for example, as described above, the name of the first gift object, the character string similar to the name, or the like) from the gift API server device 20A, and generates the request information for displaying the first gift object on the moving image including the animation of the avatar object.

Next, in ST305, the terminal device 10A of the distribution user displays the first gift object corresponding to the request information on the moving image including the animation of the avatar object, based on the request information that is transmitted from the server device 20 in ST304. Note that, when the terminal device 10A of the distribution user displays the first gift object corresponding to the request information on the moving image, the terminal device 10A of the distribution user refers to the identification information such as the name/the shape/the color/the first collision region of the first gift object, stored in the gift storage unit 150 described above.

Next, in ST306, in a case where it is determined that the avatar object executes the predetermined action with respect to one or a plurality of first gift objects displayed on the moving image, the terminal device 10A of the distribution user displays the second gift object on the moving image. Note that, the determination relevant to the predetermined action is executed by the determination unit 120 of the terminal device 10A of the distribution user as described above. In addition, a processing method of the first gift object subjected to the predetermined action, a method for displaying the second gift object on the moving image, and the like are as described above.

As described above, the step is ended with the display of the second gift object on the moving image.

5. Modification Example

In one embodiment described above, the generation of the moving image (including the moving image on which the first gift object is displayed and the moving image on which the second gift object is displayed) is executed by the terminal device 10 of the distribution user, but in another embodiment, for example, the generation may be executed by the server device 20 or the terminal device 10 of the viewing user. In this case, a rendering unit (not illustrated) may be provided in the server device 20 or the terminal device 10 of the viewing user, and the terminal device 10 of the distribution user may generate only various information items (for example, various identification information items relevant to the first gift object or various identification information items relevant to second gift object) such that the server device 20 or the terminal device 10 of the viewing user are capable of generating the moving image (including the moving image on which the first gift object is displayed and the moving image on which the second gift object is displayed).

In order to attain such a configuration, each of the functions of the server device 20, the terminal device 10 of the viewing user, and the terminal device 10 of the distribution user can be adopted in another embodiment that is suitably changed from one embodiment described above. For example, in one embodiment, the moving image generation unit 100 is provided in the terminal device 10, but may be provided in the server device 20, or may be provided in the terminal device 10 and the terminal device 10 of the viewing user.

In addition, in one embodiment described above, the determination relevant to whether or not the predetermined action described above is executed is executed by the terminal device 10 of the distribution user, but in another embodiment, the determination may be executed by the server device 20 or the terminal device 10, and the terminal device 10 of the viewing user. In this case, the server device 20 or the terminal device 10 of the viewing user has the same function as the determination unit 120.

Therefore, according to various embodiments, it is possible to provide a moving image processing method, a server device and a computer program, for increasing a gifting opportunity of the viewing user. Further, the first gift object is changed to the second gift object, and thus, it is possible to increase the variation of the gift object to be displayed on the moving image. In addition, in various embodiments, in the case of changing a plurality of first gift objects to one second gift object, the number of first gift objects displayed in a limited region of the display unit 110 of the terminal device 10 of the viewing user can be smoothly reduced (in this case, it is preferable that the size of the second gift object to be displayed on the moving image is smaller than that of the first gift object), and gifting motivation of the viewing user can be efficiently improved. In addition, according to the embodiment in which the first gift object is changed to the second gift object through the predetermined action of the distribution user (the avatar object), it is possible to create a trigger for executing some action with respect to the distribution user. In addition, according to various embodiments, the viewing user is capable of transmitting advice associated with the predetermined action to the distribution user, as the comment information (for example, the comment information of "Bump two stuffed toy boys in hands against each other!" of the viewing user with respect to the distribution user), and thus, communication between the distribution user and the viewing user is activated.

6. Various Aspects

A moving image processing method according to a first aspect is "a moving image processing method to be executed by one or a plurality of processors that execute a computer-readable command, which includes: a generation step of generating a moving image including an animation of an avatar object of a distribution user, based on a motion of the distribution user; a reception step of receiving a request signal that is generated based on a manipulation of a viewing user viewing the moving image and requests that a first gift object is applied to the avatar object from a terminal device of the viewing user through a communication line; a first display step of displaying the first gift object that is applied to the avatar object based on the request signal on the moving image; and a second display step of displaying a second gift object different from the first gift object subjected to a predetermined action on the moving image in a case where it is determined that the avatar object executes the predetermined action with respect to one or a plurality of first gift objects displayed on the moving image, based on the motion of the distribution user".

A moving image processing method according to a second aspect is the moving image processing method according to the first aspect described above, in which "the predetermined action is an action that the avatar object moves the first gift object to a specific position, based on the motion of the distribution user".

A moving image processing method according to a third aspect is the moving image processing method according to the first aspect described above, in which "the predetermined action is an action that the avatar object brings at least one first gift object into contact with another first gift object, based on the motion of the distribution user".

A moving image processing method according to a fourth aspect is the moving image processing method according to the third aspect described above, in which "a first collision region is set in each of the first gift objects, and in a case where it is determined that at least two first collision regions overlap with each other in at least a part of the moving image, it is recognized that at least two first gift objects are in contact with each other".

A moving image processing method according to a fifth aspect is the moving image processing method according to the fourth aspect described above, in which "the determination of whether or not at least two first collision regions overlap with each other in at least a part of the moving image is executed based on a position coordinate of each of the first collision regions, based on an X axis that is a horizontal direction, a Y axis that is a depth direction, and a Z axis that is a vertical direction in the moving image".

A moving image processing method according to a sixth aspect is the moving image processing method according to the second aspect described above, in which "a first collision region is set in each of the first gift objects, a second collision region is set in a hand of the avatar object, in a case where it is determined that the first collision region and the second collision region overlap with each other in at least a part of the moving image and in a case where it is determined that fingers of the avatar object are bent, based on the motion of the distribution user, it is recognized that the first gift object is gripped by the avatar object, and in a case where a gripped state of the first gift object by the avatar object is started in a first position of the moving image, and the gripped state is maintained up to a second position of the moving image that is different from the first position, it is recognized that the action for moving the first gift object to the specific position is executed".

A moving image processing method according to a seventh aspect is the moving image processing method according to the sixth aspect described above, in which "the determination of whether or not the first collision region and the second collision region overlap with each other in at least a part of the moving image is executed based on a position coordinate of the first collision region and a position coordinate of the second collision region, based on an X axis that is a horizontal direction, a Y axis that is a depth direction, and a Z axis that is a vertical direction in the moving image".

A moving image processing method according to an eighth aspect is the moving image processing method according to the second aspect described above, in which "the second gift object is determined based on the specific position, a type of the first gift object, and the number of applications for each type of the first gift objects, and is displayed on the moving image".

A moving image processing method according to a ninth aspect is the moving image processing method according to the third aspect or the fourth aspect described above, in which "the second gift object is determined based on a type of the first gift object and the number of applications for each type of the first gift objects, and is displayed on the moving image".

A moving image processing method according to a tenth aspect is the moving image processing method according to the ninth aspect described above, in which "the second gift object is further determined based on a contact time between the first gift objects, and is displayed on the moving image".

A moving image processing method according to an eleventh aspect is the moving image processing method according to the ninth aspect or the tenth aspect described above, in which "the second gift object is further determined based on a collision rate when the first gift objects are in contact with each other, and is displayed on the moving image".

A moving image processing method according to a twelfth aspect is the moving image processing method according to any one of the first aspect to the eleventh aspect described above, in which "in the second display step, in a case where it is determined that the avatar object executes the predetermined action, the first gift object subjected to the predetermined action is deleted from the moving image".

A moving image processing method according to a thirteenth aspect is the moving image processing method according to any one of the first aspect to the eleventh aspect described above, in which "in the second display step, in a case where it is determined that the avatar object executes the predetermined action, the first gift object subjected to the predetermined action is changed to the second gift object, and the second gift object is displayed on the moving image".

A moving image processing method according to a fourteenth aspect is the moving image processing method according to any one of the first aspect to the eleventh aspect described above, in which "in the second display step, in a case where it is determined that the avatar object executes the predetermined action, at least one first gift object of the plurality of first gift objects subjected to the predetermined action is deleted from the moving image, and at least the other first gift object is changed to the second gift object".

A moving image processing method according to a fifteenth aspect is the moving image processing method according to any one of the twelfth aspect to the fourteenth aspect described above, in which "the second gift object is displayed in a position different from a position in which the first gift object has existed in the moving image, before being deleted from the moving image or before being changed to the second gift object".

A moving image processing method according to a sixteenth aspect is the moving image processing method according to any one of the first aspect to the fifteenth aspect described above, in which "the second display step includes a step of displaying an effect object indicating a state in which the avatar object starts the predetermined action and the second gift object is being displayed on the moving image, on the moving image".

A moving image processing method according to a seventeenth aspect is the moving image processing method according to any one of the first aspect to the sixteenth aspect described above, in which "the generation step, the first display step, and the second display step are executed by a terminal device of the distribution user".

A moving image processing method according to an eighteenth aspect is the moving image processing method according to the seventeenth aspect described above, in which "the reception step is executed by a server device that is connected to the terminal device of the viewing user or the terminal device of the distribution user through the communication line, and it is determined that the avatar object executes the predetermined action with respect to the first gift object displayed on the moving image, by the terminal device of the distribution user".

A moving image processing method according to a nineteenth aspect is the moving image processing method according to any one of the first aspect to the sixteenth aspect described above, in which "the generation step, the reception step, the first display step, and the second display step are executed by a server device that is connected to the terminal device of the viewing user or a terminal device of the distribution user through the communication line".

A moving image processing method according to a twentieth aspect is the moving image processing method according to the nineteenth aspect described above, in which "it is determined that the avatar object executes the predetermined action with respect to the first gift object displayed on the moving image, by the terminal device of the distribution user".

A moving image processing method according to a twenty-first aspect is the moving image processing method according to any one of the first aspect to the sixteenth aspect described above, in which "the generation step, the first display step, and the second display step are executed by the terminal device of the viewing user".

A moving image processing method according to a twenty-second aspect is the moving image processing method according to the twenty-first aspect described above, in which "the reception step is executed by a server device that is connected to the terminal device of the viewing user or a terminal device of the distribution user through the communication line, and it is determined that the avatar object executes the predetermined action with respect to the first gift object displayed on the moving image, by the terminal device of the distribution user".

A moving image processing method according to a twenty-third aspect is the moving image processing method according to any one of the first aspect to the twenty-second aspect described above, in which "the processor is a central processing unit (CPU), a microprocessor, or a graphics processing unit (GPU)".

A moving image processing method according to a twenty-fourth aspect is the moving image processing method according to any one of the first aspect to the twenty-third aspect described above, in which "the communication line includes the internet".

A server device according to a twenty-fifth aspect is "a server device, including: one or a plurality of processors, in which the processor generates a moving image including an animation of an avatar object of a distribution user, based on a motion of the distribution user, receives a request signal that is generated based on a manipulation of a viewing user viewing the moving image and requests that a first gift object is applied to the avatar object from a terminal device of the viewing user through a communication line, displays the first gift object that is applied to the avatar object based on the request signal on the moving image, and displays a second gift object different from the first gift object subjected to a predetermined action on the moving image in a case where it is determined that the avatar object executes the predetermined action with respect to one or a plurality of first gift objects displayed on the moving image, based on the motion of the distribution user, by the terminal device of the distribution user".

A server device according to a twenty-sixth aspect is "a server device, including: one or a plurality of processors, in which the processor transmits information for generating a moving image including an animation of an avatar object of a distribution user, based on a motion of the distribution user, to a terminal device of the distribution user, generating the moving image, or a terminal device of a viewing user, receives a request signal that is generated based on a manipulation of the viewing user viewing the moving image and requests that a first gift object is applied to the avatar object from the terminal device of the viewing user through a communication line, transmits information relevant to the first gift object that is applied to the avatar object based on the request signal to the terminal device of the distribution user, displaying the first gift object on the moving image, or the terminal device of the viewing user, and transmits information relevant to a second gift object different from the first gift object subjected to a predetermined action to the terminal device of the distribution user, displaying the second gift object on the moving image, or the terminal device of the viewing user in a case where it is determined that the avatar object executes the predetermined action with respect to one or a plurality of first gift objects displayed on the moving image, based on the motion of the distribution user, by the terminal device of the distribution user".

A server device according to a twenty-seventh aspect is the server device according to the twenty-fifth aspect or the twenty-sixth aspect described above, in which "the processor is a central processing unit (CPU), a microprocessor, or a graphics processing unit (GPU)".

A server device according to a twenty-eighth aspect is the server device according to any one of the twenty-fifth aspect to the twenty-seventh aspect described above, in which "the communication line includes the internet".

A computer program according to a twenty-ninth aspect is "a computer program to be executed by one or a plurality of processors such that the processor functions to: generate a moving image including an animation of an avatar object of a distribution user, based on a motion of the distribution user; receive a request signal that is generated based on a manipulation of a viewing user viewing the moving image and requests that a first gift object is applied to the avatar object from a server device or a terminal device of the viewing user through a communication line; display the first gift object that is applied to the avatar object based on the request signal on the moving image; and display a second gift object different from the first gift object subjected to a predetermined action on the moving image in a case where it is determined that the avatar object executes the predetermined action with respect to one or a plurality of first gift objects displayed on the moving image, based on the motion of the distribution user".

A computer program according to a thirtieth aspect is "a computer program to be executed by one or a plurality of processors such that the processor functions to: transmit information for generating a moving image including an animation of an avatar object of a distribution user, based on a motion of the distribution user, to a server device generating the moving image or a terminal device of a viewing user; receive a request signal that is generated based on a manipulation of the viewing user viewing the moving image and requests that a first gift object is applied to the avatar object from the server device or the terminal device of the viewing user through a communication line; transmit information relevant to the first gift object that is applied to the avatar object based on the request signal to the server device displaying the first gift object on the moving image or the terminal device of the viewing user; and transmit information relevant to a second gift object different from the first gift object subjected to a predetermined action to the server device displaying the second gift object on the moving image or the terminal device of the viewing user in a case where it is determined that the avatar object executes the predetermined action with respect to one or a plurality of first gift objects displayed on the moving image, based on the motion of the distribution user".

A computer program according to a thirty-first aspect is the computer program according to the twenty-ninth aspect or the thirtieth aspect described above, in which "the processor is a central processing unit (CPU), a microprocessor, or a graphics processing unit (GPU)".

A computer program according to a thirty-second aspect is a computer program according to any one of the twenty-ninth aspect to the thirty-first aspect described above, in which "the communication line includes the internet".

A computer program according to a thirty-third aspect is "a computer program to be executed by one or a plurality of processors such that the processor functions to: receive information relevant to a moving image from a server device or a terminal device of a distribution user, in order to generate the moving image including an animation of an avatar object of the distribution user, based on a motion of the distribution user; transmit a request signal that is generated based on a manipulation of a viewing user viewing the moving image and requests that a first gift object is applied to the avatar object through a communication line; receive information relevant to the first gift object from the server device or the terminal device of the distribution user, in order to display the first gift object that is applied to the avatar object based on the request signal on the moving image; and receive information relevant to a second gift object from the server device or the terminal device of the distribution user, in order to display the second gift object different from the first gift object subjected to a predetermined action on the moving image in a case where it is determined that the avatar object executes the predetermined action with respect to one or a plurality of first gift objects displayed on the moving image, based on the motion of the distribution user, by the terminal device of the distribution user".

A computer program according to a thirty-fourth aspect is "a computer program to be executed by one or a plurality of processors such that the processor functions to: receive a moving image including an animation of an avatar object of a distribution user, based on a motion of the distribution user, from a server device or a terminal device of the distribution user; transmit a request signal that is generated based on a manipulation of a viewing user viewing the moving image and requests that a first gift object is applied to the avatar object through a communication line; receive the moving image on which the first gift object that is applied to the avatar object based on the request signal is displayed from the server device or the terminal device of the distribution user; and receive the moving image on which a second gift object different from the first gift object subjected to a predetermined action is displayed from the server device or the terminal device of the distribution user in a case where it is determined that the avatar object executes the predetermined action with respect to one or a plurality of first gift objects displayed on the moving image, based on the motion of the distribution user, by the terminal device of the distribution user".

A computer program according to a thirty-fifth aspect is the computer program according to the thirty-third aspect or the thirty-fourth aspect described above, in which "the processor is a central processing unit (CPU), a microprocessor, or a graphics processing unit (GPU)".

A computer program according to a thirty-sixth aspect is the computer program according to any one of the thirty-third aspect to the thirty-fifth aspect described above, in which "the communication line includes the internet".

A terminal device of a distribution user according to a thirty-seventh aspect is "a terminal device that generates a moving image including an animation of an avatar object of a distribution user, based on a motion of the distribution user, receives a request signal that is generated based on a manipulation of a viewing user viewing the moving image and requests that a first gift object is applied to the avatar object from a server device or a terminal device of the viewing user through a communication line, displays the first gift object that is applied to the avatar object based on the request signal on the moving image, and displays a second gift object different from the first gift object subjected to a predetermined action on the moving image in a case where it is determined that the avatar object executes the predetermined action with respect to one or a plurality of first gift objects displayed on the moving image, based on the motion of the distribution user".

A terminal device of a distribution user according to a thirty-eighth aspect is "a terminal device that transmits information for generating a moving image including an animation of an avatar object of a distribution user, based on a motion of the distribution user, to a server device generating the moving image or a terminal device of a viewing user, receives a request signal that is generated based on a manipulation of the viewing user viewing the moving image and requests that a first gift object is applied to the avatar object from the server device or the terminal device of the viewing user through a communication line, transmits information relevant to the first gift object that is applied to the avatar object based on the request signal to the server device displaying the first gift object on the moving image or the terminal device of the viewing user, and transmits information relevant to a second gift object different from the first gift object subjected to a predetermined action to the server device displaying the second gift object on the moving image or the terminal device of the viewing user in a case where it is determined that the avatar object executes the predetermined action with respect to one or a plurality of first gift objects displayed on the moving image, based on the motion of the distribution user".

A terminal device of a viewing user according to a thirty-ninth aspect is "a terminal device to be executed by one or a plurality of processors such that the terminal device receives information relevant to a moving image from a server device or a terminal device of a distribution user, in order to generate the moving image including an animation of an avatar object of the distribution user, based on a motion of the distribution user, transmits a request signal that is generated based on a manipulation of a viewing user viewing the moving image and requests that a first gift object is applied to the avatar object through a communication line, receives information relevant to the first gift object from the server device or the terminal device of the distribution user, in order to display the first gift object that is applied to the avatar object based on the request signal on the moving image, and receive information relevant to a second gift object from the server device or the terminal device of the distribution user, in order to display the second gift object different from the first gift object subjected to a predetermined action on the moving image in a case where it is determined that the avatar object executes the predetermined action with respect to one or a plurality of first gift objects displayed on the moving image, based on the motion of the distribution user, by the terminal device of the distribution user".

A terminal device of a viewing user according to a fortieth aspect is "a terminal device that receives a moving image including an animation of an avatar object of a distribution user, based on a motion of the distribution user, from a server device or a terminal device of the distribution user, transmits a request signal that is generated based on a manipulation of a viewing user viewing the moving image and requests that a first gift object is applied to the avatar object through a communication line, receives the moving image on which the first gift object that is applied to the avatar object based on the request signal is displayed from the server device or the terminal device of the distribution user, and receives the moving image on which a second gift object different from the first gift object subjected to a predetermined action is displayed from the server device or the terminal device of the distribution user in a case where it is determined that the avatar object executes the predetermined action with respect to one or a plurality of first gift objects displayed on the moving image, based on the motion of the distribution user, by the terminal device of the distribution user".

7. Field to which Technology Disclosed in Present Application is Applied

The technology disclosed in the present application, for example, can be applied to the following fields.

(1) An application/service for distributing a live moving image in which an avatar object appears (2) An application/service (a chat application, a messenger, a mail application, and the like) capable of performing communication by using characters and avatar objects.

What is claimed is:

1. A moving image processing method to be executed by a processor that executes a computer-readable command, the method comprising:
    generating a moving image including an animation of an avatar object of a distribution user, based on a motion of the distribution user;
    receiving a request signal that is generated based on a manipulation of a viewing user viewing the moving image and requests that a first gift object is applied to the avatar object from a terminal device of the viewing user through a communication line;
    displaying the first gift object that is applied to the avatar object based on the request signal on the moving image; and
    displaying a second gift object different from the first gift object subjected to a predetermined action on the moving image in a case where it is determined that the avatar object executes the predetermined action with respect to one or a plurality of first gift objects displayed on the moving image, based on the motion of the distribution user.

2. The moving image processing method according to claim 1,
    wherein the predetermined action is an action that the avatar object moves the first gift object to a specific position, based on the motion of the distribution user.

3. The moving image processing method according to claim 2, wherein the first gift object includes a plurality of first gift objects, and a first collision region is set in each of the plurality of first gift objects, a second collision region is set in a hand of the avatar object, in a case where it is determined that the first collision region and the second collision region overlap with each other in at least a part of the moving image and in a case where it is determined that fingers of the avatar object are bent, based on the motion of the distribution user, it is recognized that the first gift object is gripped by the avatar object, and in a case where a gripped state of the first gift object by the avatar object is started in a first position of the moving image, and the gripped state is maintained up to a second position of the moving image that is different from the first position, it is recognized that the action for moving the first gift object to the specific position is executed.

4. The moving image processing method according to claim 3, wherein the determination of whether or not the first collision region and the second collision region overlap with each other in at least a part of the moving image is executed based on a position coordinate of the first collision region and a position coordinate of the second collision region, based on an X axis that is a horizontal direction, a Y axis that is a depth direction, and a Z axis that is a vertical direction in the moving image.

5. The moving image processing method according to claim 2, wherein the second gift object is determined based on the specific position, a type of the first gift object, and the number of applications for each type of the first gift objects, and is displayed on the moving image.

6. The moving image processing method according to claim 1, wherein the first gift object includes a plurality of first gift objects, and the predetermined action is an action that the avatar object brings at least one first gift object of the plurality of first gift objects into contact with another first gift object of the plurality of first gift objects, based on the motion of the distribution user.

7. The moving image processing method according to claim 6, wherein a first collision region is set in each of the plurality of first gift objects, and in a case where it is determined that at least two first collision regions overlap with each other in at least a part of the moving image, it is recognized that at least two first gift objects of the plurality of first gift objects are in contact with each other.

8. The moving image processing method according to claim 7, wherein the determination of whether or not at least two first collision regions overlap with each other in at least a part of the moving image is executed based on a position coordinate of each of the first collision regions, based on an X axis that is a horizontal direction, a Y axis that is a depth direction, and a Z axis that is a vertical direction in the moving image.

9. The moving image processing method according to claim 6, wherein the second gift object is determined based on a type of the first gift object and a number of applications for each type of the first gift object, and is displayed on the moving image.

10. The moving image processing method according to claim 9, wherein the second gift object is further determined based on a contact time between the first gift object, and is displayed on the moving image.

11. The moving image processing method according to claim 9, wherein the first gift object includes a plurality of first gift objects, and the second gift object is further determined based on a collision rate when the plurality of first gift objects are in contact with each other, and the collision rate is displayed on the moving image.

12. The moving image processing method according to claim 1, wherein when displaying the second gift object, in a case where it is determined that the avatar object executes the predetermined action, the first gift object subjected to the predetermined action is deleted from the moving image.

13. The moving image processing method according to claim 12, wherein the second gift object is displayed in a position different from a position in which the first gift object has existed in the moving image, before being deleted from the moving image or before being changed to the second gift object.

14. The moving image processing method according to claim 1, wherein when displaying the second gift object, in a case where it is determined that the avatar object executes the predetermined action, the first gift object subjected to the predetermined action is changed to the second gift object, and the second gift object is displayed on the moving image.

15. The moving image processing method according to claim 1, wherein the first gift object includes a plurality of first gift objects, and when displaying the second gift object, in a case where it is determined that the avatar object executes the predetermined action, at least one first gift object of the plurality of first gift objects subjected to the predetermined action is deleted from the moving image, and at least one other first gift object is changed to the second gift object.

16. The moving image processing method according to claim 1, wherein displaying the second gift object includes displaying an effect object indicating a state in which the avatar object starts the predetermined action and the second gift object is being displayed on the moving image.

17. The moving image processing method according to claim 1, wherein generating the moving image, displaying the first gift object, and displaying the second gift object are executed by a terminal device of the distribution user.

18. The moving image processing method according to claim 17, wherein receiving the request signal is executed by a server device that is connected to the terminal device of the viewing user or the terminal device of the distribution user through the communication line, and it is determined that the avatar object executes the predetermined action with respect to the first gift object displayed on the moving image, by the terminal device of the distribution user.

19. The moving image processing method according to claim 1,
wherein generating the moving image, receiving the request signal, displaying the first gift object, and displaying the second gift object are executed by a server device that is connected to the terminal device of the viewing user or a terminal device of the distribution user through the communication line.

20. The moving image processing method according to claim 19,
wherein it is determined that the avatar object executes the predetermined action with respect to the first gift object displayed on the moving image, by the terminal device of the distribution user.

21. The moving image processing method according to claim 1,
wherein generating the moving image, displaying the first gift object, and displaying the second gift object are executed by the terminal device of the viewing user.

22. The moving image processing method according to claim 21,
wherein receiving the request signal is executed by a server device that is connected to the terminal device of the viewing user or a terminal device of the distribution user through the communication line, and
it is determined that the avatar object executes the predetermined action with respect to the first gift object displayed on the moving image, by the terminal device of the distribution user.

23. The moving image processing method according to claim 1,
wherein the processor is a central processing unit (CPU), a microprocessor, or a graphics processing unit (GPU).

24. The moving image processing method according to claim 1,
wherein the communication line includes the internet.

25. A non-transitory computer readable medium storing a computer program to be executed by a processor such that the processor functions to:
generate a moving image including an animation of an avatar object of a distribution user, based on a motion of the distribution user;
receive a request signal that is generated based on a manipulation of a viewing user viewing the moving image and requests that a first gift object is applied to the avatar object from a server device or a terminal device of the viewing user through a communication line;
display the first gift object that is applied to the avatar object based on the request signal on the moving image; and
display a second gift object different from the first gift object subjected to a predetermined action on the moving image in a case where it is determined that the avatar object executes the predetermined action with respect to one or a plurality of first gift objects displayed on the moving image, based on the motion of the distribution user.

26. The non-transitory computer readable medium according to claim 25,
wherein the processor is a central processing unit (CPU), a microprocessor, or a graphics processing unit (GPU).

27. The non-transitory computer readable medium according to claim 25,
wherein the communication line includes the internet.

28. The non-transitory computer readable medium of claim 25, wherein the processor includes a plurality of processors.

29. A non-transitory computer readable medium comprising instructions that, when executed by a processor, cause the processor to function to:
transmit information for generating a moving image including an animation of an avatar object of a distribution user, based on a motion of the distribution user, to a server device generating the moving image or a terminal device of a viewing user;
receive a request signal that is generated based on a manipulation of the viewing user viewing the moving image and requests that a first gift object is applied to the avatar object from the server device or the terminal device of the viewing user through a communication line;
transmit information relevant to the first gift object that is applied to the avatar object based on the request signal to the server device displaying the first gift object on the moving image or the terminal device of the viewing user; and
transmit information relevant to a second gift object different from the first gift object subjected to a predetermined action to the server device displaying the second gift object on the moving image or the terminal device of the viewing user in a case where it is determined that the avatar object executes the predetermined action with respect to one or a plurality of first gift objects displayed on the moving image, based on the motion of the distribution user.

30. The non-transitory computer readable medium of claim 29, wherein the processor includes a plurality of processors.

* * * * *